United States Patent [19]
Webber et al.

[11] Patent Number: 5,414,708
[45] Date of Patent: May 9, 1995

[54] METHOD AND APPARATUS FOR CONNECTING NODES FOR A COMPUTER NETWORK

[75] Inventors: Harold H. Webber, Berkeley; John Marum, Oakland, both of Calif.

[73] Assignee: Farallon Computing, Inc., Alameda, Calif.

[21] Appl. No.: 985,169

[22] Filed: Dec. 1, 1992

[51] Int. Cl.⁶ ............................................... H04J 3/02
[52] U.S. Cl. ...................................... 370/85.3; 370/16
[58] Field of Search ..................... 370/85.5, 85.15, 75, 370/13, 56, 13.1, 60, 94.3, 85.2, 85.3, 91, 92, 93, 94.1, 94.2, 94.3, 97, 16; 375/3, 3.1, 4, 10, 118, 119, 120, 170, 70 R; 379/4.18; 455/7, 9; 340/825.02, 825.06, 825.07, 825.5, 825.51, 825.52, 825.01; 371/20.1, 20.2, 20.4, 20.5; 380/6, 9, 68, 49; 271/11

[56] References Cited

U.S. PATENT DOCUMENTS

| | | | |
|---|---|---|---|
| 4,063,220 | 12/1977 | Metcalfe et al. | 370/85.2 |
| 4,099,024 | 7/1978 | Boggs et al. | 370/85.2 |
| 4,531,238 | 7/1985 | Rawson et al. | 340/825.5 |
| 4,837,856 | 6/1989 | Glista, Jr. | 340/827 |
| 4,862,158 | 8/1989 | Keller et al. | 340/825.05 |
| 5,010,550 | 4/1991 | Hirata | 370/16 |
| 5,101,405 | 3/1992 | Bekki et al. | 370/85.15 |
| 5,193,086 | 3/1993 | Satomi et al. | 370/16 |
| 5,200,949 | 4/1993 | Kobayashi | 370/16 |
| 5,251,203 | 10/1993 | Thompson | 370/94.3 |

FOREIGN PATENT DOCUMENTS

0190662  8/1986  European Pat. Off. ............ 359/179

*Primary Examiner*—Douglas W. Olms
*Assistant Examiner*—Ajit Patel
*Attorney, Agent, or Firm*—Hecker & Harriman

[57] ABSTRACT

The present invention provides a method and apparatus for extending an Ethernet 10Base-T local area network topology from only allowing point-to-point link segments to allowing daisy-chained segments having multiple nodes on each segment. Thus, computer equipment can be connected in a bus topology while retaining the characteristics of a 10Base-T node according to IEEE Standard 802.3 for 10Base-T Ethernet. In the preferred embodiment of the present invention, a non-reclocking repeater at a 10Base-T node retransmits data packets from the node to subsequent nodes in a daisy-chained segment. When the repeater is not powered, bypass circuitry connects the two ends of 10Base-T wiring to remove the inactive node from the daisy-chain segment. The repeater includes modular connectors and analog transmit and receive sections for transmitting and receiving differential signals between two network link interfaces and an AUI. The repeater further comprises digital logic to implement the functional circuitry of a 10Base-T Medium Attachment Unit (MAU). It includes logic to detect data packets having two formats and link pulses. Because the IEEE Standard 802.3 only allows a fixed number of bits to be lost at a 10Base-T node, a repeater retransmits data packets having formats such that nodes further down the segment do not lose additional bits. The present invention also includes diagnostic circuitry including LEDs to aid installation and to provide useful information including collision detection and link integrity.

20 Claims, 26 Drawing Sheets

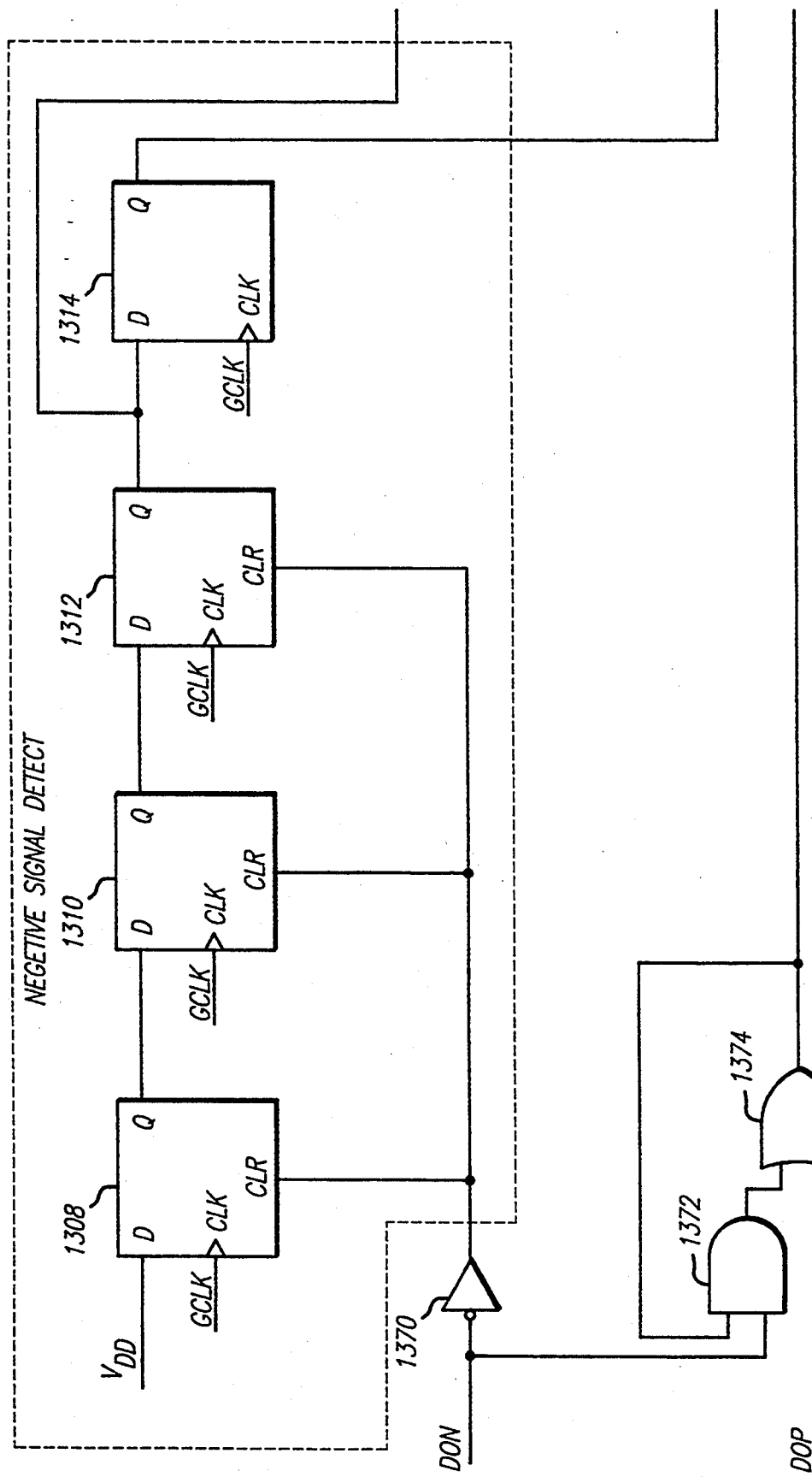

METHOD AND APPARATUS FOR CONNECTING NODES FOR A COMPUTER NETWORK

BACKGROUND OF THE INVENTION

1. Field of the Invention

This invention relates to the field of computer networks.

2. Background Art

Current Ethernet systems described by the ANSI/IEEE 802.3 standard typically use one of four media to connect computer equipment to a computer network: thick coax (thicknet), optical fiber, thin coax (thinnet), or twisted pair wiring (commonly referred to as 10Base-T). Twisted pair wiring is hereinafter referred to as simply 10Base-T. Of these four media, the more costly thicknet and optical fiber are mainly used for connections over long distances such as between buildings. Less expensive thinnet and 10Base-T are used to connect computer equipment including personal computers (PC), workstations, etc. Thinnet and 10Base-T each have their own advantages and disadvantages.

A local area network using thinnet is constructed by connecting segments of coaxial cable together forming a bus topology using either custom-cut lengths of cable having crimped-on baby N connectors (BNC) or fixed length pre-made lengths of cable. At each end of the assembled cable is a terminator. A connection to the cable is made via a T connector that is inserted between two cable segments. The T connector attaches to computer equipment, referred to as Data Terminal Equipment (DTE) in IEEE Standard 802.3, using a Medium Attachment Unit (MAU). The MAU should be a simple, inexpensive, and flexible means of attaching computer equipment to the media which, in this case, is coaxial cable. The MAU converts signals on coaxial cable into a standard electrical interface referred to as an Attachment Unit Interface (AUI) which is common to nearly all Ethernet equipment.

IEEE Standard 802.3 for 10Base-2 Ethernet defines the functional, electrical, and mechanical specifications for a thinner MAU. A thinnet MAU handles message flow between computer equipment and a thinnet bus. The MAU must be able to transmit streams of serial data from computer equipment to the thinnet bus, receive streams of serial data from the thinnet bus and transmit the data to computer equipment, detect collisions on the network due to another MAU transmitting concurrently with the local MAU, and automatically interrupt the transmit function to inhibit a long data stream. An optional monitor function disables the transmit function and prevents improper loading of the bus due to the disabled transmitter while permitting computer equipment to continue receiving data and detect collisions.

FIG. 1 is a diagram illustrating a method of adding computer equipment to a network having a bus topology implemented with coaxial cable (i.e. thinnet). The diagram shows a network segment comprising T connectors 106 and 108, terminator 110 and MAUs 102 and 104 having AUIs 130 and 132, respectively. AUIs 130 and 132 are interfaces to computer equipment. A thinnet cable 120 is coupled between a previous thinnet node (not shown in FIG. 1) and T connector 106. T connector 106 is coupled to MAU 102 and to thinnet cable 122. Thinnet cable 122 is coupled to T connector 108. T connector 108 is coupled to MAU 104 and to thinnet cable 124. Thinnet cable 124 is coupled to terminator 110.

A typical network begins with one cable segment 120 connecting two PCs or computer equipment. MAU 102 is coupled to the second computer equipment. When a third PC or item of computer equipment having AUI 132 coupled to MAU 104 is added to the network, a terminator 110 is removed from an end of cable segment 122, a new T connector 108 is attached between the aforesaid cable 122 and a new segment of cable 124, and terminator 110 is placed on the end of new cable segment 124 as illustrated in FIG. 1. Additional PCs or computer equipment may be added in a similar fashion. This method of wiring is commonly referred to as daisy-chaining.

Thinnet has the advantage of being easy to install and allowing easy growth of a network. No external equipment other than cable and MAUs is required to construct a network. In addition, cables and MAUs can be acquired incrementally: for each additional node added to the network, one thinnet MAU, one T connector, and one additional segment of coaxial cable are needed. Attaching additional nodes to an existing network is as simple as purchasing a MAU, a T connector, and a segment of coaxial cable for each node, and then stringing these items on either end of the existing cable in the manner described above.

The disadvantage of using thinnet becomes apparent as the network grows. Coaxial cable cannot be easily routed to all parts of a building, especially when the cable must remain connected together as a continuous segment. In addition, if the cable should break or be disconnected at any point, the two resulting halves become useless because they are not terminated at the break. Due to thinnet's bus topology and the lack of diagnostic capability built into the MAUs, finding the location where the break has occurred is not easily accomplished without specialized equipment (such as a time domain reflectometer), that the user is unlikely to have.

A competing wiring system, 10Base-T, builds a network as illustrated in FIG. 2A comprising an active hub 200 and nodes 202, 204 and 206. A port 200A of active hub 200 is coupled to node 202 by two 10Base-T twisted pairs 208 comprising transmit pair 208A and receive pair 208B. Port 200B of active hub 200 is coupled to node 204 by two 10Base-T twisted pairs 210 comprising transmit pair 210A and receive pair 210B. Port 200C of active hub 200 is coupled to node 206 by two 10Base-T twisted pairs 212 comprising transmit pair 212A and receive pair 212B.

The network illustrated in FIG. 2A comprises an external active hub 200 that is centrally located to connect to each node 202, 204 and 206 over standard telephone twisted pair wiring 208, 210 and 212. Each node 202, 204 and 206 requires its own separate connection to hub 200 using two pairs 208, 210 and 212 of wire (one pair 208A, 210A and 212A for transmitting signals and the other pair 208B, 210B and 212B for receiving signals), respectively. At nodes 202, 204 and 206, computer equipment connects to a port 200A–200C of an active hub 200, respectively, using a 10Base-T MAU thereby forming a point-to-point link between an active hub 200 and DTEs. The hub 200 consists of a reclocking repeater that has a separate port 200A–200C for each node connected to it. If another node is added to the network, the network requires two pairs of wire connecting the node to its own port on the hub. This type of wiring is usually referred to as either a star-topology or structured wiring, and is used by most telephone systems.

IEEE Standard 802.3 for 10Base-T Twisted Pair Ethernet defines the functional, electrical, and mechanical specifications for the 10Base-T MAU and the medium. A 10Base-T MAU handles message flow between computer equipment or hub (repeater) and a twisted pair link. The MAU must be able to transmit streams of serial data from computer equipment to the twisted pair link, receive streams of serial data from the twisted pair link and transmit data to computer equipment, detect collisions on the network due to another MAU transmitting concurrently with the local MAU, verify that the MAU and AUI are connected, automatically interrupt the transmit function by inhibiting a long data stream, and to test and disable a receive link if the link is faulty.

The chief disadvantage of 10Base-T is that it requires an external hub, each port of which can only connect to one node. However, one of the main advantages of using 10Base-T medium is avoiding the cost and inconvenience of routing cable to each node since telephone-grade twisted pair wiring already exists in most buildings and is therefore easier to use than coaxial cable or optical fiber. Since 10Base-T requires 4 wires (two twisted wire pairs) for each node, the supply of existing wiring in a building may be used up quickly. If two nodes are located in a room that only has one 10Base-T connection (two pairs of wires), two additional pairs of wires must be routed to the location to connect the second node to the hub, thus defeating one of the advantages of using existing twisted pair wiring.

In addition, each node added uses up an additional port on a hub, thereby requiring the installer to purchase an appropriate number of hubs to match the number of nodes. If the number of nodes exceeds the number of ports on a hub, an additional hub must be purchased to accommodate the nodes and the expense of the remaining unused ports is lost. For installations that have standardized on 10Base-T, the increasing number of nodes that must be added to the network becomes a major problem. Current alternative methods of adding nodes to a 10Base-T also have their difficulties.

FIG. 2B is a block diagram illustrating a 10Base-T network comprising active hub 230, mini-hub 240 and nodes 232, 234, 236 and 238 that uses 10Base-T mini-hub 240 to add nodes 236 and 238 to network. Ports 230A–230C of active hub 230 are coupled to nodes 232 and 234 and mini-hub 240 by 10Base-T twisted wire pairs 242, 244 and 246, respectively. Each 10Base-T twisted wire pairs 242, 244 and 246 comprises transmit pair 242A, 244A and 246A and receive pair 242B, 244B and 246C, respectively. Ports 240A and 240B of mini-hub 240 are coupled to nodes 236 and 238 by two twisted wire pairs 248 and 250 comprising transmit pair 248A and 250A and receive pair 248B and 250B, respectively.

If an additional two pairs of wire and an unused hub port are not available in a network as shown in FIG. 2A, a 10Base-T mini hub 240 can be connected to the main network as illustrated in FIG. 2B, and nodes 236 and 238 can then be connected to two ports 240A and 240B of the added mini hub 240. In this manner, a node comprising mini-hub 240 coupled to port 230C of active hub 230 connects nodes 236 and 238 to the network. However, this dramatically increases the incremental cost of adding a single node since an entire hub must be added. In addition, the Ethernet specification limits the number of hubs that can be between nodes, so adding an additional hub may not even be possible without violating the Ethernet standard.

FIG. 2C is a block diagram comprising active hub 260, nodes 262–270, and a 10Base-T to thinnet converter 272 that illustrates another common method of adding a node to a network. Ports 260A–260C of active hub 260 are coupled to nodes 262 and 264 and to 10Base-T to thinnet converter 272 by 10Base-T twisted wire pairs 274, 276 and 278, respectively. Each 10Base-T twisted wire pairs 274, 276 and 278 comprises transmit pair 274A, 276A and 278A and receive pair 274B, 276B and 278C, respectively. A thinnet bus 280 couples nodes 266, 268 and 270 to 10Base-T to thinnet converter 272 in a daisy-chain manner.

10Base-T to thinner converter 272 allows nodes 266, 268 and 270 to be daisy-chained together using thinnet cable, and then to connect the thinnet segment 280 to a main 10Base-T network comprising active hub 260 and nodes 262 and 264 through converter 272. Again, this method has the disadvantage of requiring an external device (10Base-T to thinnet converter 272) to expand a single 10Base-T port 260C of active hub 260 in order to connect to multiple nodes 266–270. It is also not an incremental addition, since the node that is initially a 10Base-T port must first be converted to a thinnet port.

SUMMARY OF THE PRESENT INVENTION

The present invention provides a method and apparatus for extending the Ethernet 10Base-T local area network topology from only allowing point-to-point link segments to allowing daisy-chained segments with multiple nodes on each segment. In this manner, computer equipment can be connected in a bus topology while retaining the characteristics of a 10Base-T node according to IEEE Standard 802.3 for 10Base-T Twisted Pair Ethernet.

In the preferred embodiment of the present invention, a non-reclocking repeater at a 10Base-T node coupled to a port of an active hub retransmits data packets from the node to subsequent nodes in a daisy-chained segment. When the repeater is not powered, bypass circuitry connects together the two ends of 10Base-T twisted pair wiring that are coupled to the node in order to remove the inactive node from the daisy-chain segment. This prevents the network from being rendered unusable by a node that is down.

The repeater includes modular connectors and analog transmit and receive sections for transmitting and receiving differential signals according to IEEE Standard 802.3 to and from the two network link interfaces and an AUI that couples computer equipment to the node. The analog circuitry allows a daisy-chain of nodes to be connected without violating IEEE standards for a cable segment. Further, the present invention does not reduce the range of an existing 10Base-T network to which it attaches.

The repeater also comprises digital logic to implement the functional circuitry of a 10Base-T Medium Attachment Unit (MAU). The digital logic also includes circuitry to detect data packets having two formats and link pulses. Because the IEEE Standard 802.3 only allows a fixed number of bits to be lost at a 10Base-T node, a repeater retransmits data packets having formats such that nodes further down the segment do not lose additional bits.

The present invention also includes diagnostic circuitry including LEDs to aid installation and to provide useful information including collision detection and link integrity.

BRIEF DESCRIPTION OF THE DRAWINGS

FIGS. 13(a), 13(b), and 13(c) are detailed schematics of a Jabber section, a Negative Detect section and an AUI EOP Detect section implemented using a Gate Array in the preferred embodiment of the present invention for an AUI port.

DESCRIPTION

A method and an apparatus for connecting nodes on a computer network is described. In the following description, numerous specific details, such as number and nature of receivers, line drivers, gates, etc., are described in detail in order to provide a more thorough description of the present invention. It will be apparent, however, to one skilled in the art that the present invention may be practiced without these specific details. In other instances, well known features have not been described in detail so as not to unnecessarily obscure the present invention.

The present invention being a Medium Attachment Unit (MAU) extends an Ethernet 10Base-T local area network topology from allowing only point-to-point link segments to allowing daisy-chained segments with multiple nodes on each segment. The present invention does this by adding a non-reclocking repeater at each 10Base-T node which retransmits data packets from that node to the following node in the chain according to the present invention. In the case where a repeater is not powered, bypass circuitry connects the two ends of the chain together to remove the inactive node from the daisy chain.

Figure 1:
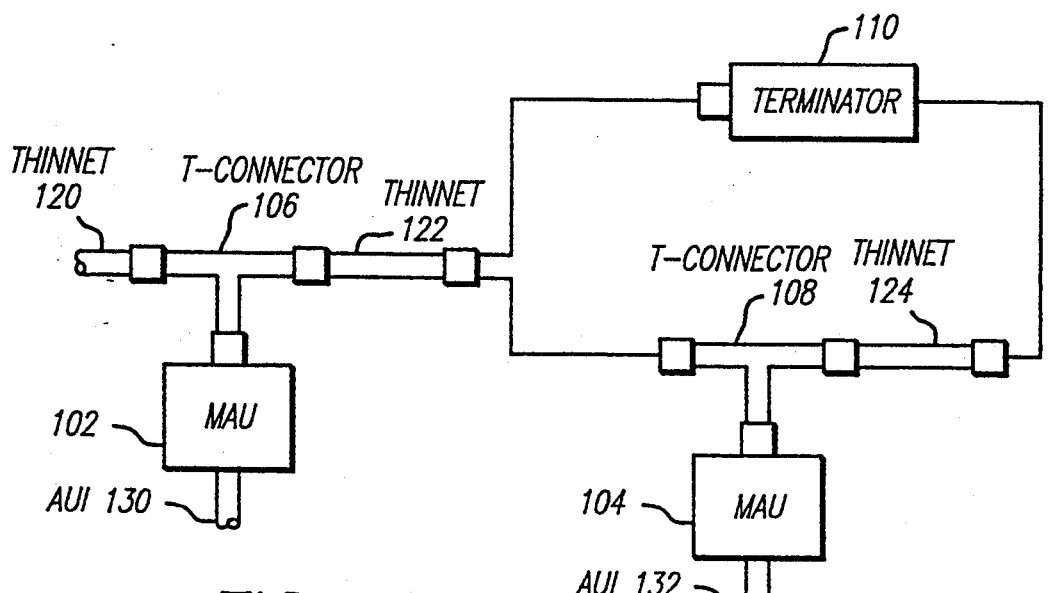
FIG. 1 is a diagram illustrating the addition of another node to a thinnet network by daisy-chaining another T connector, MAU, and new cable segment.
Figure 3:
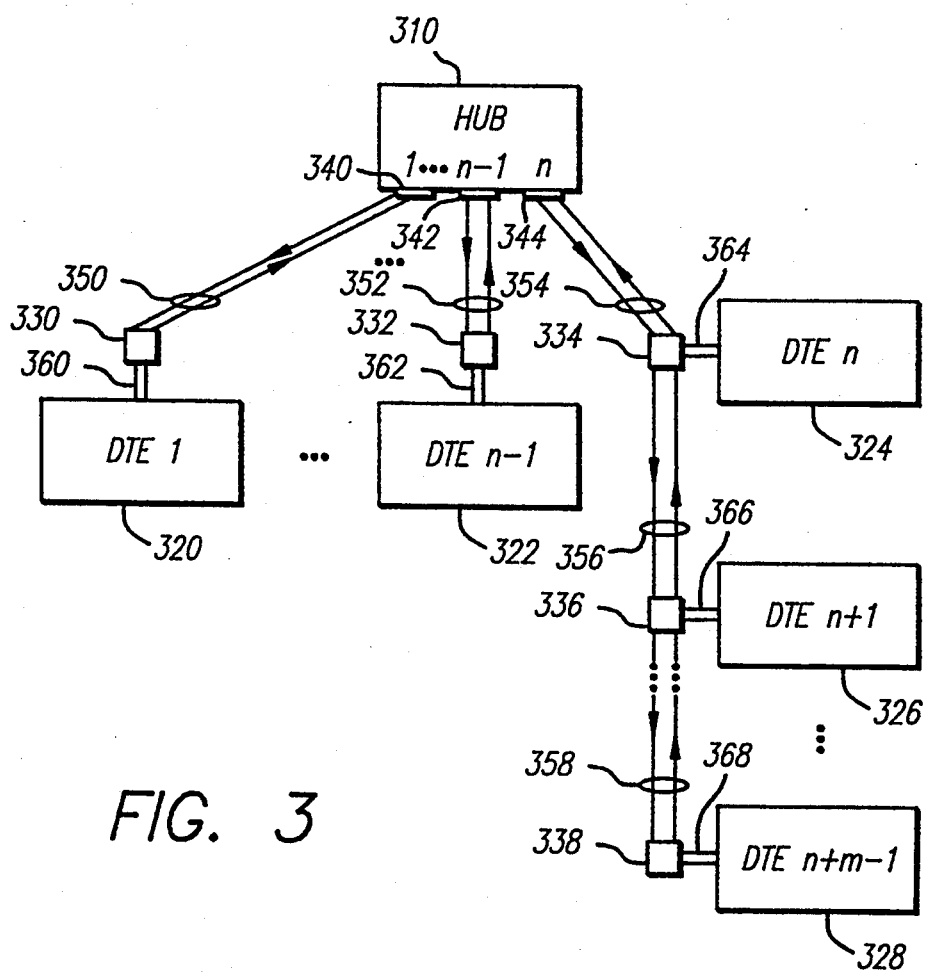
FIG. 3 is a diagram that illustrates daisy-chaining nodes to form a multiple tapped bus using MAUs according to the present invention in a star network topology.
Figure 2A:
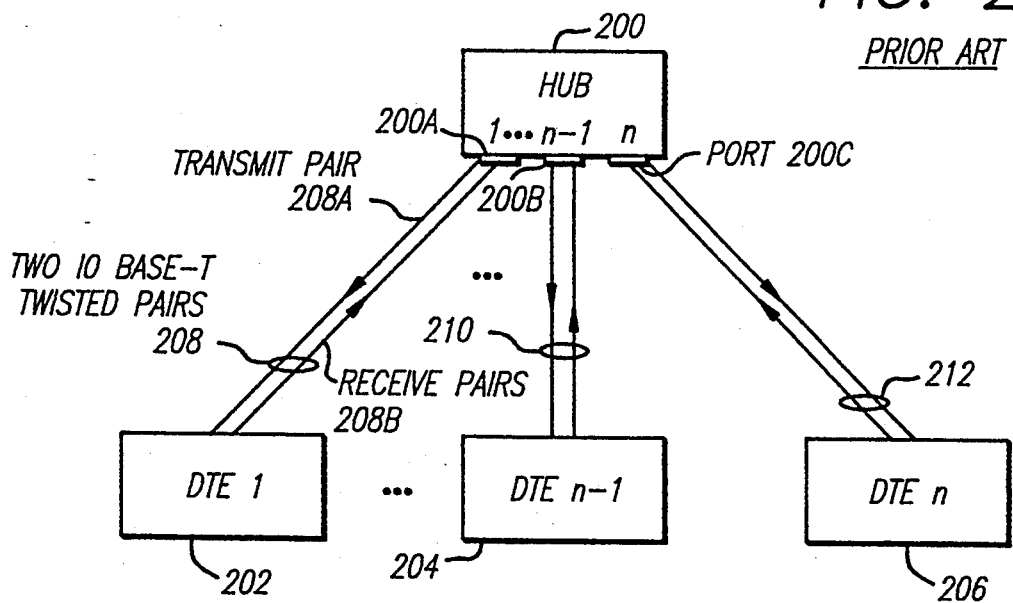
FIGS. 2A-2C are diagrams illustrating 10Base-T networks including a central hub only, a mini-hub, and a 10Base-T to thinnet converter, respectively.
Figure 2B:
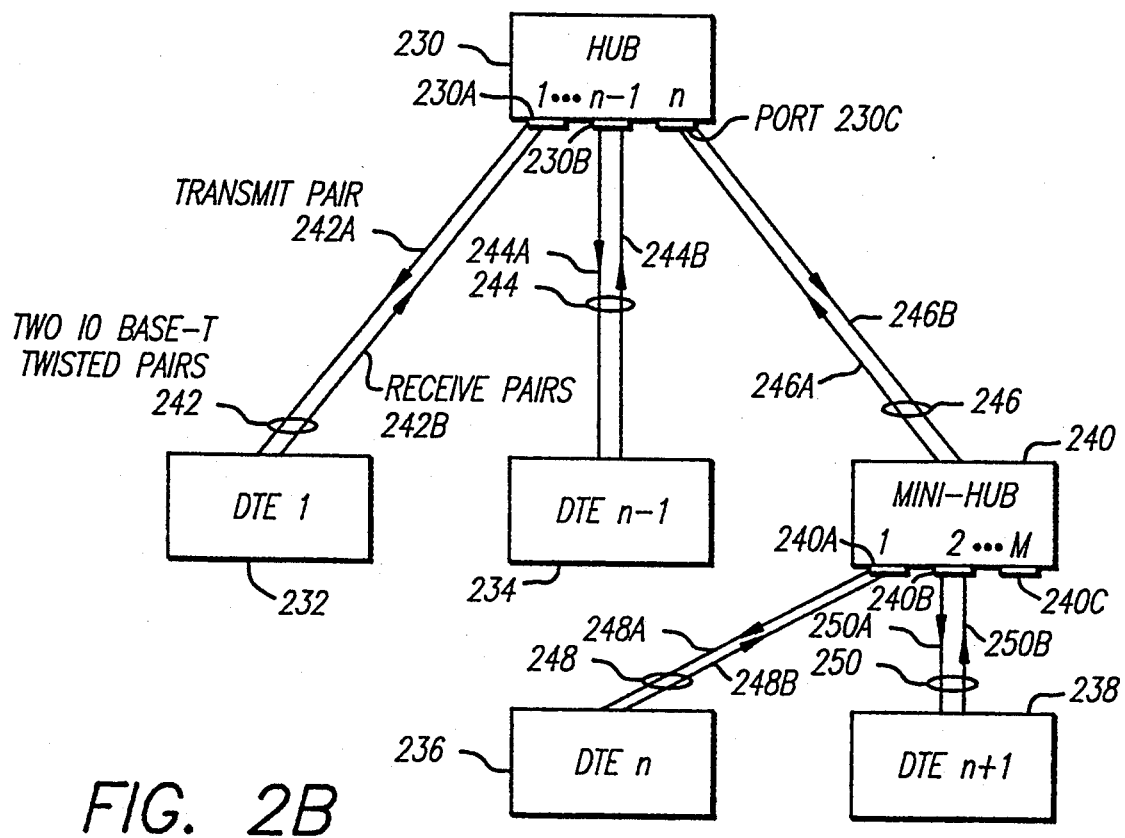
Figure 2C:
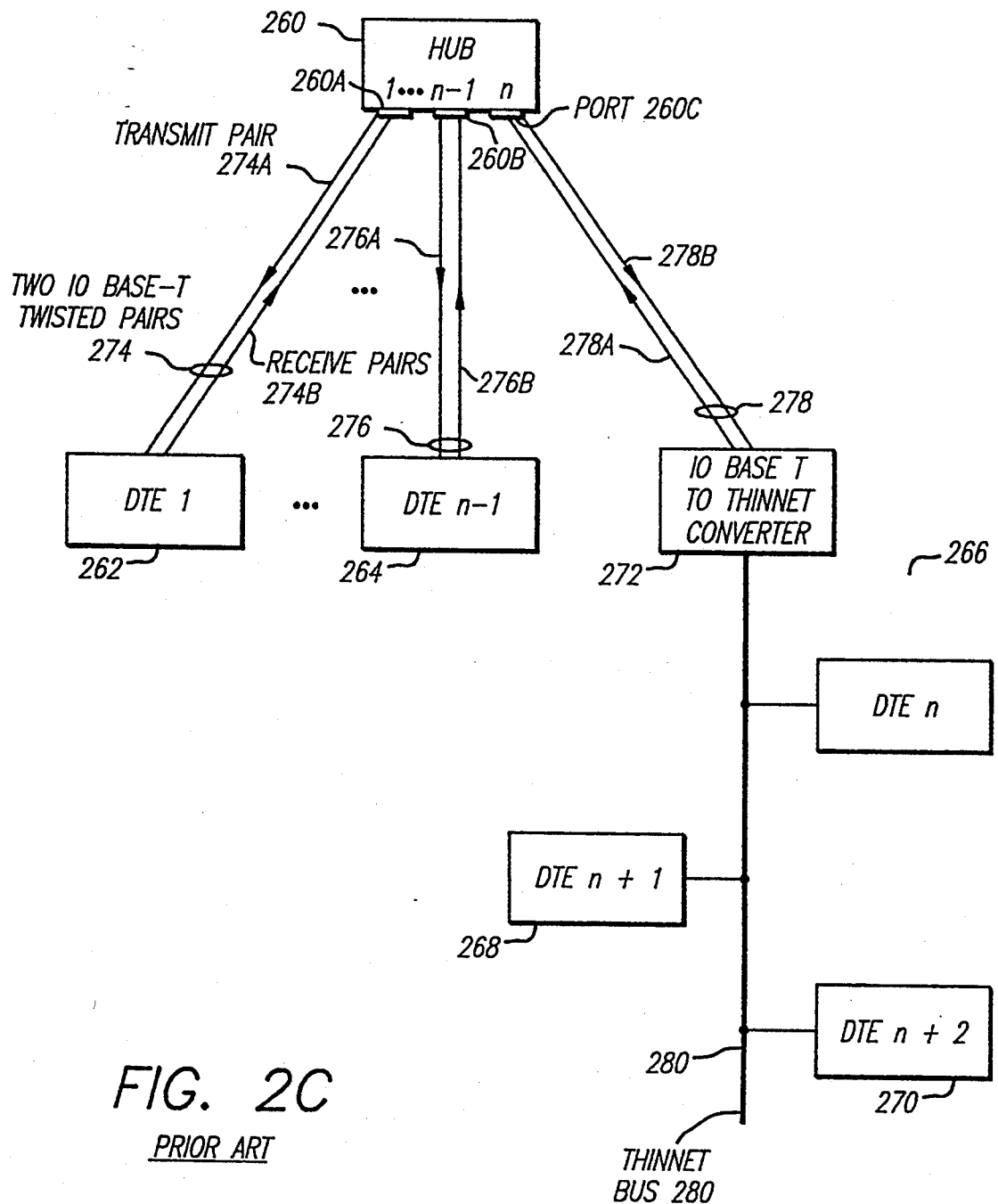

FIG. 3 illustrates a local area network having a star topology which includes a daisy-chain of nodes having MAUs of the present invention that are coupled by 10Base-T twisted pair links. An active hub 310 is shown in FIG. 3 including n ports 340, 342, and 344. Port 340 of hub 310 is coupled to 10Base-T MAU 330 by a 10Base-T twisted pair link 350. DTE 320 is coupled to 10Base-T MAU 330 by AUI 360. Port 342 is coupled to 10Base-T MAU 332 by 10Base-T twisted pair link 352. DTE 322 is coupled to 10Base-T MAU 332 by an AUI 362. Port 344 is coupled to MAU 334 of the present invention by 10Base-T twisted pair 354. DTE 324 is coupled to MAU 334 by AUI 364. The first MAU 334 is coupled to a second MAU 336 of the present invention by 10Base-T twisted pair link 356. DTE 326 is coupled to MAU 336 by AUI 366. MAU 336 is coupled to MAU 338 of the present invention by twisted pair link 358. DTE 328 is coupled to MAU 338 by AUI 368.

FIG. 3 illustrates a daisy-chain of m DTEs coupled to port 344, while n−1 10Base-T nodes are connected in point-to-point links to ports 340 and 342 of active hub 310. However, either or both 10Base-T nodes 340 and 342, each having a single DTE, can be replaced by a daisy-chain of nodes coupled by 10Base-T twisted pair links similar to the daisy-chain of nodes coupled to port 344.

A main advantage of the invention is that a point-to-point 10Base-T link segment appears as a multiple tapped bus segment. Small networks can be built by simply chaining together the present invention without the need for a separate active hub. If a structured wiring system already exists, additional nodes can be added to one of the 10Base-T link segments by adding a node according to the present invention between the hub and an existing 10Base-T node. Additional nodes according to the present invention can be added to this chain incrementally.

System reliability is improved over existing bus architectures, such as thinnet, because the segments are self-terminating. Unlike thinnet, a break in a chain comprising nodes according to the present invention does not render the entire network unusable. The self termination feature which is inherent in the 10Base-T specification (through the use of special link integrity pulses) isolates unterminated segments from the rest of the network. In addition, the link integrity test indicators found on nearly all 10Base-T nodes make it easy to locate a bad segment.

Figure 4:
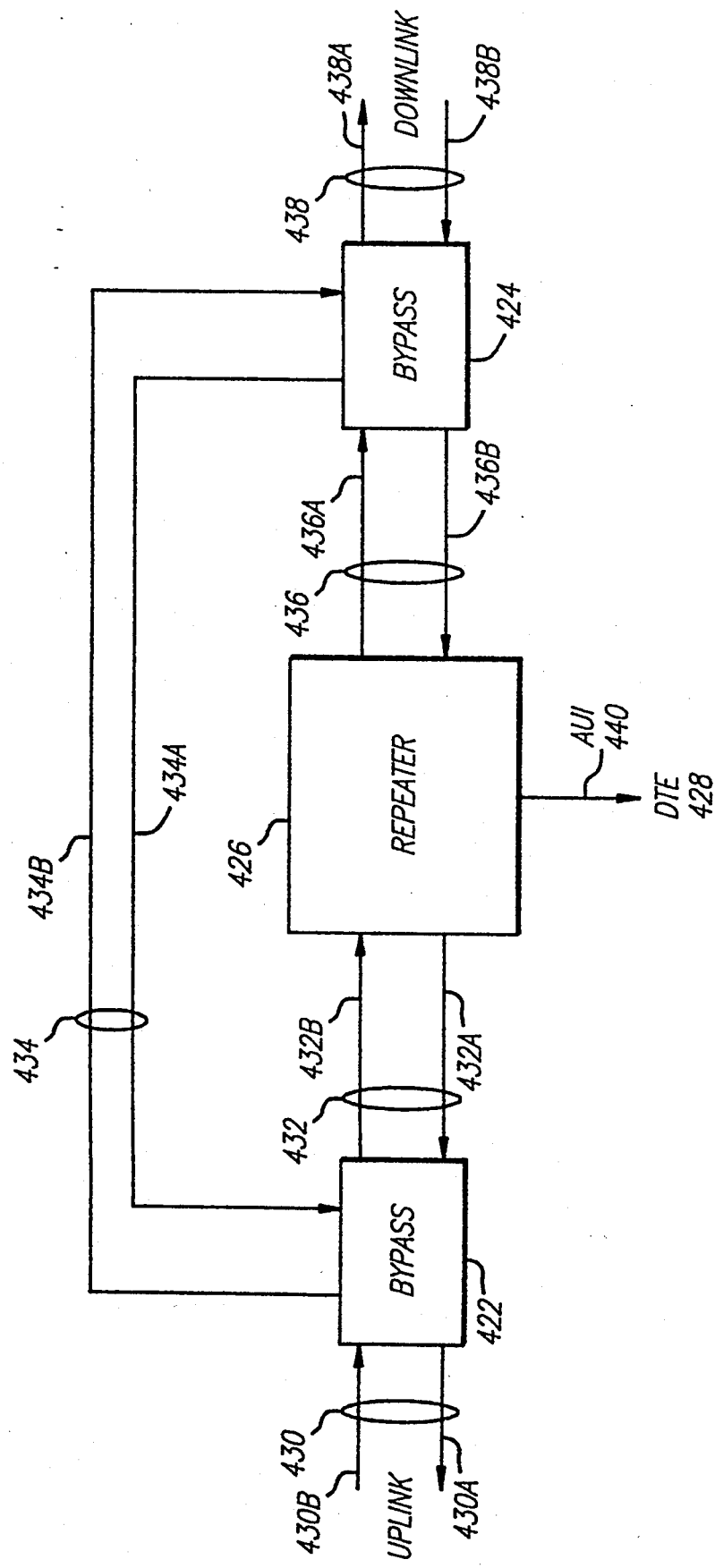
FIG. 4 is a block diagram of a MAU according to the present invention.

A block diagram of the present invention shown in FIG. 4 includes a first and second bypass circuit 422 and 424, repeater 426, and an AUI 440. An uplink node is coupled to bypass circuit 422 by twisted wire pairs 430 comprising a transmit circuit 430A and a receive circuit 430B. Bypass circuit 422 is coupled to bypass circuit 424 by coupling 434 comprising a transmit circuit 434A and a receive circuit 434B. Bypass circuit 422 is also coupled to repeater 426 by a transmit circuit 432A and a receive circuit 432B. Repeater 426 is coupled to bypass circuit 424 by a transmit circuit 436A and a receive circuit 436B. Repeater 426 is also coupled to DTE 428 by AUI 440. Bypass circuit 424 is coupled to a downlink node by twisted wire pairs 438 comprising a transmit circuit 438A and a receive circuit 438B.

As illustrated in FIG. 4, the present invention consists of two 10Base-T ports 430 and 438 connected through bypass circuitry 422 and 424 to a repeater section 426, which also connects to an AUI 440 of computer equipment 428. If the computer equipment 428 does not supply power to the MAU of the present invention (e.g. if computer equipment is powered down or the MAU is disconnected), bypass circuits 422 and 424 bridge the two 10Base-T ports 430 and 438 and isolate the inactive repeater 426 from the network. Data packets can pass freely through the MAU as if the node were removed from the chain.

Once the computer equipment 428 powers up the MAU, bypass circuits 422 and 424 route the two 10Base-T ports 430 and 438 into the central repeater section 426. Data packets received on one 10Base-T port are received by repeater 426 and retransmitted to both AUI 428 and the other 10Base-T port. Data packets received from AUI 440 are repeated on both 10Base-T ports 430 and 438. If data packets are received from two or more sources simultaneously, repeater 426 arbitrarily selects one of them to be repeated out of all ports and signals a collision to the computer equipment 428 through AUI 440.

Figure 15:
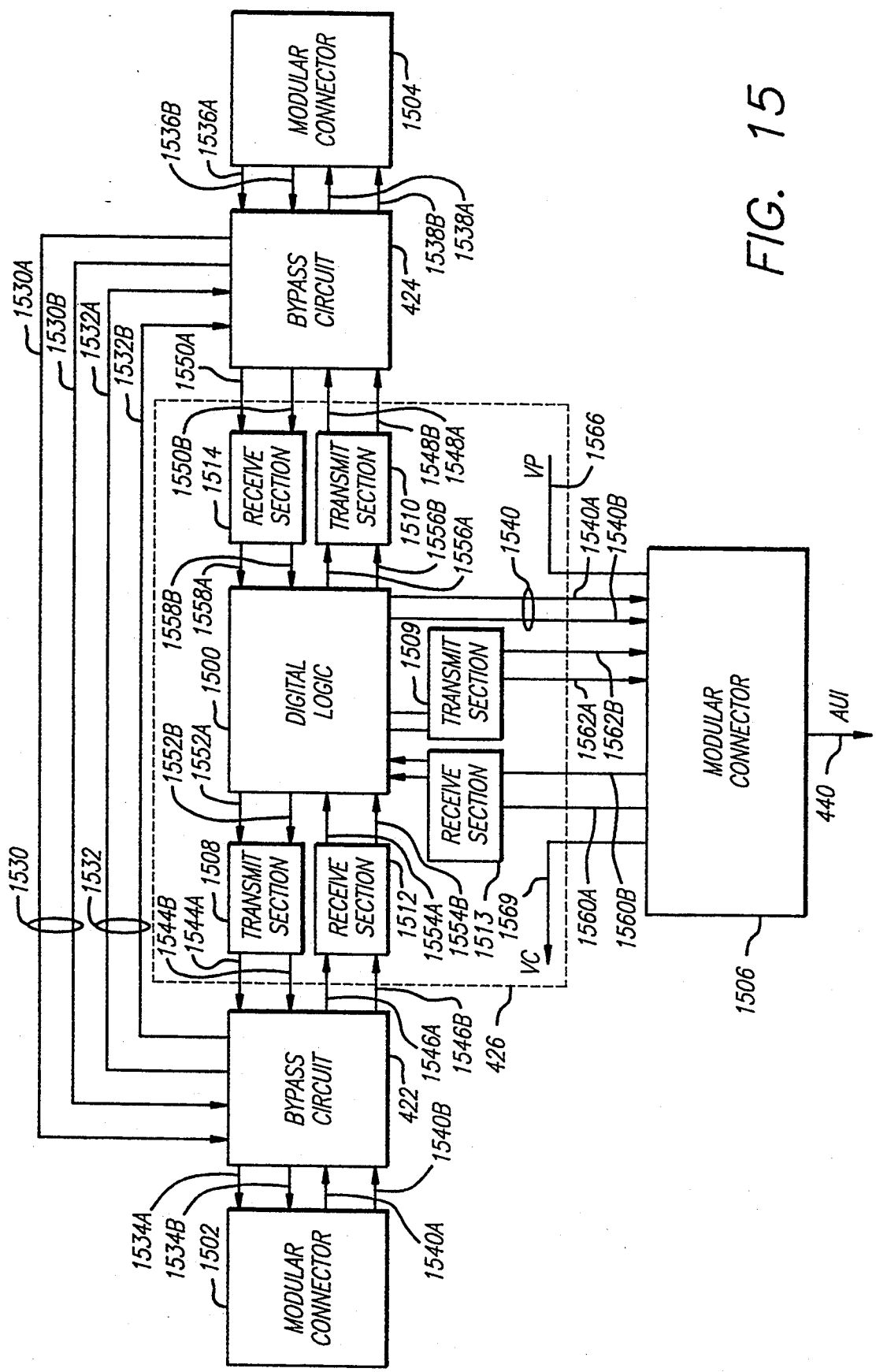
FIG. 15 is an intermediate level drawing of the present invention including bypass circuitry and a repeater comprising receive and transmit circuits for three interfaces and digital logic.

A intermediate level diagram of the present invention is illustrated in FIG. 15 including modular connectors 1502-1506, bypass circuitry 422 and 424, and repeater 426 comprising transmit sections 1508-1510, receive sections 1512-1514, and digital logic 1500. Modular connector 1502 is coupled to bypass circuitry 422 by receive circuit 1540 comprising lines 1540A and 1540B and transmit circuit 1534 comprising lines 1534A and 1534B. Similarly, modular connector 1504 is coupled to bypass circuit 424 by receive circuit 1536 comprising lines 1536A and 1536B and transmit circuit 1538 comprising lines 1538A and 1538B. Bypass circuitry 422 is coupled to bypass circuitry 424 by bypass coupling 1530 comprising lines 1530A and 1530B and bypass coupling 1532 comprising lines 1532A and 1532B.

Bypass circuitry 422 is coupled to transmit section 1508 by lines 1544A and 1544B and to receive section 1512 by lines 1546A and 1546B. Bypass circuitry 424 is coupled to transmit section 1510 by lines 1548A and 1548B and to receive section 1514 by lines 1550A and 1550B. Transmit section 1508 is coupled to digital logic 1500 by lines 1552A and 1552B. Receive section 1512 is coupled to digital logic 1500 by lines 1554A and 1554B. Transmit section 1510 is coupled to digital logic 1500 by lines 1556A and 1556B. Receive section 1514 is coupled to digital logic 1500 by lines 1558A and 1558B.

Modular connector 1506 is coupled to an AUI 440. Modular connector 1506 is coupled to receive section 1513 by lines 1560A and 1560B and to transmit section 1509 by lines 1562A and 1562B. Lines 1540A and 1540B provide a Collision signal from digital logic 1500 to modular connector 1506. Lines 1566 and 1569 of modular connector 1506 provide supply voltage VP and voltage common VC from AUI 440 to power the circuitry.

Supply voltage VP provided by AUI 440 couples the receive circuit 1540 and transmit circuit 1543 through bypass circuitry 422 to receive section 1512 and transmit section 1508, respectively. Similarly, the receive circuit 1536 and transmit circuit 1538 of modular connector 1504 are coupled through bypass circuitry to receive section 1514 and transmit section 1510 when powered. When AUI 440 does not provide power to bypass circuitry 422 and 424 and repeater 426, the receive circuit 1540 of modular connector 1502 is coupled to the transmit circuit 1538 of modular connector 1504 by bypass circuitry 422-424 and bypass lines 1532A and 1532B. Similarly, receive circuit 1536 of modular connector 1504 is coupled to transmit circuit 1534 by bypass circuitry 422-424 and bypass lines 1530A and 1530B.

Digital logic 1500 provides functional circuitry of a 10Base-T MAU specified by IEEE Standard 802.3 as well as circuitry to receive and retransmit data packets having specific bit pattern formats to other nodes connected in a daisy-chain (described below). Receive sections 1512-1514 process signals from the 10Base-T network links coupled to modular connectors 1502 and 1504 and from computer equipment coupled to modular connector 1506 by AUI 440 to digital logic 1500. Transmit sections 1508-1510 transmit signals from digital logic 1500 of repeater 426 to the 10Base-T network links coupled to modular connectors 1502 and 1504 and to computer equipment coupled to modular connector 1506 by AUI 440.

One of the difficulties in adding a chain of repeaters into a 10Base-T link segment is the IEEE Standard 802.3 limitation on the number of bits which can be lost (i.e. truncated from the beginning of a data packet) before the data packet reaches either a reclocking repeater (i.e. an active hub) or its destination node. An additional requirement limits the allowed delay through the segment as well. A repeater 426 must recognize the beginning of an incoming data packet at one port of a MAU of the present invention and begin retransmitting the packet out the other port without dropping too many bits or unduly delaying the data packet.

This bit loss and delay problem is further complicated by the presence of link pulses on 10Base-T link segments. Link pulses each consist of a single positive pulse and are sent down the 10Base-T link periodically (in the absence of data packets) to indicate the presence of an intact link between transmitter and receiver. The design of a repeater must overcome the dilemma of how to faithfully repeat both data packets and link pulses while remaining within the limits for bit loss and delay set by IEEE Standard 802.3.

Figure 5A:
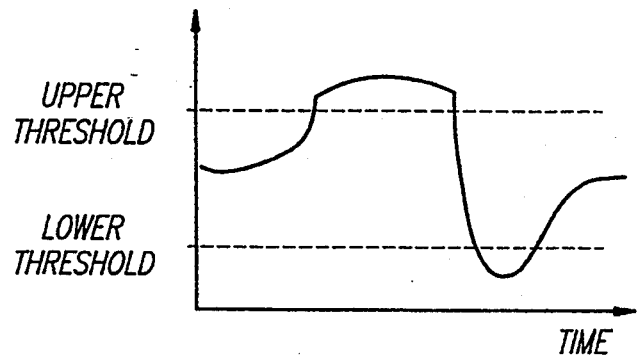
FIGS. 5A-5B illustrate link pulses before and after passing through receivers of a repeater.
Figure 5B:
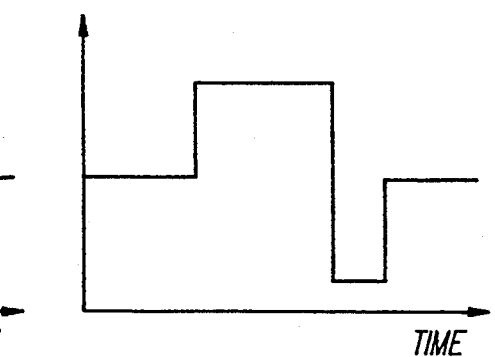

Link pulses are illustrated in FIGS. 5A-5B before and after passing through a receiver 1512-1514 of repeater 426. The drawing of FIG. 5A illustrates a link pulse that is input to a receiver 1512-1514 having three output levels: zero (Z), high (H), and low (L). A zero level is outputted by the receiver 1512–1514 for an input pulse level between the two threshold levels indicated by dotted lines. A high level is outputted for an input pulse level equal to or greater than the upper threshold level, while a low level is outputted for an input pulse level equal to or less than the lower threshold level. The drawing of FIG. 5B illustrates a corresponding signal having multiple transitions produced by receiver 1512–1514 at its output.

If repeater 426 simply passes on what appears on its line receivers 1512–1514 to its transmitters 1508–1510, the link pulses run the risk of becoming distorted. Link pulses from a source nearby (repeater of adjacent node) contain a certain amount of undershoot as shown in FIG. 5A. If the undershoot exceeds the lower threshold level of a receiver 1512–1514 of repeater 426 (indicated by dotted lines), then the received signal appears as a positive pulse followed by a shortened negative pulse as shown in FIG. 5B. If this wave form is sent on to the next repeater, the process repeats itself and adds another short pulse in the positive direction to the pulse train. This distortion of the link pulse, even from only a single repeater 426, renders the link pulse distorted enough that it no longer meets the 10Base-T standard and may be rejected by the receiving node. If the separation between threshold levels of the receiver 1512–1514 of repeater 426 is increased to avoid triggering on the undershoot, the sensitivity of repeater 426 is severely reduced and it no longer operates over the maximum cable length specified in the IEEE Standard 802.3 for 10Base-T.

Another technique is to wait a fixed interval or until the end of the pulse before deciding whether the incoming signal is a link pulse or data packet. If it is a link pulse, it can safely be ignored as these pulses can easily be regenerated by the repeater. If it is a data packet, the repeater begins to pass on the received data to its transmitter. The shortfall of this method is that a bit or two is lost each time a data packet passes through a repeater in each node of the daisy-chain. Since IEEE Standard 802.3 for 10Base-T only allows a limited number of bits lost (7), this would severely limit the number of repeaters allowed in a chain.

The problem is to distinguish data packets from link pulses so that data packets can be retransmitted immediately without mistaking them for link pulses. A preferred method implemented in the present invention to do this is to encode the data packets so that the first bit of a data packet is different from the first bit of a link pulse. One way to do this (but not the only) is for digital logic 1500 of repeater 426 to force all data packets to begin with a negative going pulse as shown for signal C of FIG. 6. Since link pulses must all start with a positive pulse as indicated by signal A of FIG. 6, link pulses and data packets having these formats can be distinguished immediately by each MAU.

Figure 6:
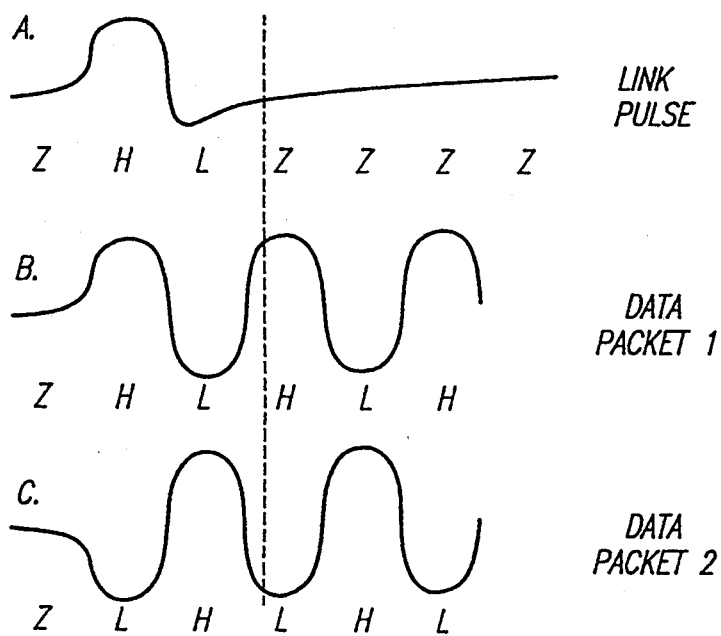
FIGS. 6A-6C are diagrams illustrating bit patterns of a link pulse and two data packets.

However, not all 10Base-T data packets begin with a negative pulse as indicated by signal B illustrated in FIG. 6. Since a MAU according to the present invention must be able to connect to an existing 10Base-T network, there is no guarantee how data packets begin. This means that the MAU can receive any one of the three types of signals illustrated in FIG. 6. The first signal A is a link pulse having a bit pattern of Z-H-L-Z where the low level in the third bit time is due to overshoot. The second signal B is a data packet 1 which begins with a positive pulse having a bit pattern of Z-H-L-H-L-H... Finally, there is a data packet 2 having the desired data packet format of Z-L-H-L-H... Since a MAU according to the present invention can receive any one of these three signals at any time (as repeaters are switched in and out), the digital logic 1500 of repeater 426 must be able to correctly identify each of them without dropping too many bits from the start of the packet.

Since only one MAU according to the present invention in a daisy-chain receives data packets from an original 10Base-T source (as shown in FIG. 3 where MAU 334 is connected to active hub 310), it is allowable that this first node take extra bits to distinguish between data packets and link pulses. It does this by examining the first three bits of the received signal. If the pattern is Z-H-L-Z, then the signal must be a link pulse and can be noted as such in the MAU's link status state machine (as described in IEEE Standard 802.3 for 10Base-T).

If the pattern is Z-L..., the signal must be the beginning of a data packet and the received data can be transmitted as soon as the first negative going pulse is detected. If the pattern begins Z-H-L-H..., the signal must be a data packet from a 10Base-T MAU rather than a MAU according to the present invention. In this case, the MAU recognizes the pattern as a data packet at the beginning of the second "H" pulse (i.e. at Z-H-L-H).

At this point, the MAU can begin retransmitting the data. However, if it did so immediately, the data packet would again begin with a positive pulse and be truncated again by the next MAU according to the present invention further down the daisy-chain. Instead, the MAU starts by beginning two negative pulses in a row, converting the data pattern from Z-H-L-H-L... to Z-L-L... This double length negative pulse distinguishes the data packet from link pulses for the benefit of MAUs further down the daisy-chain.

Alternatively, the MAU could simply wait one more bit and begin sending the data packet on the start of the second negative pulse (i.e. at Z-H-L-H-L...). The advantage of adding an extra negative pulse on the start of the packet is that distinguishing a data packet from background noise on a network takes a small amount of time (although it is less than one bit time), and extending this negative pulse in the beginning increases the amount of time the receiver MAU has to recognize the incoming data packet.

A preferred embodiment of the present invention is illustrated in FIG. 7 comprising modular connectors 712–714, relays 718 and 720, each having two inputs and four outputs, form bypass circuitry 422, relays 722 and 724, each having two inputs and four outputs, form bypass circuitry 424, and repeater 426 comprising line filters 726–729, analog receivers 734–739, line drivers 740–745, isolation transformers 746–748, LEDs 750–756, and gate array 770 that digitally processes data.

Pins 3 and 6 of modular connector 712 are coupled to inputs IN+ and IN− of relay 718, respectively. Outputs OUTA+ and OUTA− of relay 718 are coupled to outputs OUTA+ and OUTA− of relay 724 by bypass pair 701 comprising lines 701A and 701B, respectively. Outputs OUTB+ and OUTB− of relay 718 are coupled to a inputs RXI+ and RXI− of filter 726, respectively. A resistor 780 is coupled between outputs RXO+ and RXO− of filter 726. Output RXO+ of filter 726 is coupled to an inverting input of receiver 734 and to a non-inverting input of receiver 735. Output RXO− of filter 726 is coupled to a non-inverting input of receiver 734 and to an inverting input of receiver 735. The output of receiver 734 is coupled to input IN1P of gate array 770. The output of receiver 735 is coupled to input IN1N of gate array 770.

Outputs TX1P and TX1N of gate array 770 are coupled to line drivers 740 and 741, respectively. The outputs of line drivers 740 and 741 are coupled to inputs TXI+ and TXI− of filter 727, respectively. Outputs TXO+ and TXO− of filter 727 are coupled to outputs OUTB+ and OUTB− of relay 720, respectively. Outputs OUTA+ and OUTA− of relay 720 are coupled to outputs OUTA+ and OUTA− of relay 722 by bypass pair 702 comprising lines 702A and 702B, respectively. Inputs IN+ and IN− of relay 720 are coupled to pins 1 and 2 of modular connector 712, respectively.

Pins 1 and 2 of modular connector 714 are coupled to inputs IN+ and IN− of relay 722, respectively. Outputs OUTB+ and OUTB− of relay 722 are coupled to inputs RXI+ and RXI− of filter 728, respectively. A resistor 781 is coupled between outputs RXO+ and RXO− of filter 728. Output RXO− of filter 728 is coupled to an inverting input of receiver 739 and to a non-inverting input of receiver 738. Output RXO+ of filter 728 is coupled to a non-inverting input of receiver 739 and to an inverting input of receiver 738. The output 792 of receiver 738 is coupled to input IN2P of gate array 770. The output 793 of receiver 739 is coupled to input IN2N of gate array 770.

Outputs TX2P and TX2N of gate array 770 are coupled to line drivers 742 and 743. The outputs of line drivers 742 and 743 are coupled to inputs TXI+ and TXI− of filter 729, respectively. Outputs TXO+ and TXO− of filter 729 are coupled to outputs OUTB+ and OUTB− of relay 724, respectively. Inputs IN+ and IN− of relay 724 are coupled to pins 3 and 6 of modular connector 714, respectively.

Pins 1 and 2 of modular connector 713 provide AUI signals GND and VP, respectively. Pins 7 and 6 of modular connector 713 are coupled to inputs IN+ and IN− of isolation transformer 746. A resistor 783 is coupled between outputs OUT+ and OUT− of isolation transformer 746. Output OUT+ of transformer 746 is coupled to the non-inverting input of receiver 736 and the inverting input of receiver 737. Output OUT− of transformer 746 is coupled to the inverting input of receiver 736 and the non-inverting input of receiver 737. The output of receiver 736 is coupled to input DON of gate array 770. The output of receiver 737 is coupled to input DOP of gate array 770.

Outputs DIP and DIN of gate array 770 are coupled to line driver 744 and 745. The outputs of line driver 744 and 745 are coupled to inputs IN+ and IN− of transformer 747. Outputs OUT+ and OUT− of transformer 747 are coupled to pins 5 and 4 of modular connector 713, respectively. A resistor 782 is coupled between pins 5 and 4 of modular connector 713. Pins 8 and 9 of modular connector 713 are coupled to inputs IN+ and IN− of transformer 748. Outputs OUT+ and OUT− of transformer 748 to inputs CP and CN of gate array 770. A resistor 784 is coupled between outputs OUT+ and OUT− of transformer 748.

Voltage VP of pin 2 of modular connector 713 is coupled to the anode of LED 750. Resistance 760 is coupled between the cathode of LED 750 and voltage common VC of pin 1 of modular connector 713. The outputs COlLED, Rcv1LED, Rcv2LED, Link2LED, Link1LED, and TxLED of gate array 770 are coupled to the anodes of LEDs 751-756, respectively. Resistances 761-766 are coupled between the cathodes of LEDs 751-756 and voltage common VC. Clock signal 772 is provided to the CLK input of gate array 770.

Modular connectors 712 and 714 connect to a network using twisted pair cabling. Connector 712 is wired as a traditional 10Base-T MAU having pins 1 and 2 comprising a transmit pair while pins 3 and 6 comprise a receive pair. Connector 714 is a cross connect circuit having pins 1 and 2 wired so that when connector 712 of one MAU according to the present invention is connected to connector 714 of another such MAU by a 10Base-T twisted pair link, the transmit pair of the first MAU is connected to the receive pair of the other and vice versa. Connector 712 is normally used to connect to a traditional 10Base-T hub. Connector 712 of a second MAU would then connect to modular connector 714 of the first MAU, and so on.

Bypass circuitry 442 and 424 comprise four relays 718, 720, 722 and 724. Pin 2 of modular connector 713 provides power having voltage level VP from a DTE to the present invention. When a MAU according to the present invention is powered, voltage VP energizes relays 718, 720, 722 and 724. Inputs IN+ and IN− of relays 718, 720, 722 and 724 are connected to outputs OUTB+ and OUTB− of relays 718, 720, 722 and 724, respectively. Therefore, a receive circuit across pins 3 and 6 of modular connector 712 and a transmit circuit across pins 1 and 2 of modular connector 712 are connected to the inputs RXI+ and RXI− of filter 726 and outputs TXO+ and TXO− of filter 727, respectively. Similarly, a receive circuit across pins 1 and 2 of modular connector 714 and a transmit circuit across pins 3 and 6 of modular connector 714 are connected to the inputs RXI+ and RXI− of filter 728 and outputs TXO+ and TXO− of filter 729.

When a MAU according to the present invention is not powered, relays 718, 720, 722 and 724 deenergize. Inputs IN+ and IN− of relays 718, 720, 722 and 724 are connected to outputs OUTA+ and OUTA− of relays 718, 720, 722 and 724, respectively. Outputs OUTA+ and OUTA− of relay 718 are coupled to outputs OUTA+ and OUTA− of relay 724 by bypass link 701, therefore, a receive circuit across pins 3 and 6 of modular connector 712 is coupled to a transmit circuit across pins 3 and 6 of modular connector 714, respectively, by deenergized relays 718 and 724. Similarly, outputs OUTA+ and OUTA− of relay 720 are coupled to outputs OUTA+ and OUTA− of relay 722 by bypass link 702, therefore, a transmit circuit across pins 1 and 2 of modular connector 712 is coupled to a receive circuit across pins 1 and 2 of modular connector 714 by deenergized relays 720 and 722, respectively. Thus, modular connector 712 is connected to modular connector 714 which allows signals to directly pass from one connector to the other when power is not supplied to circuitry of the present invention.

Figure 7A:
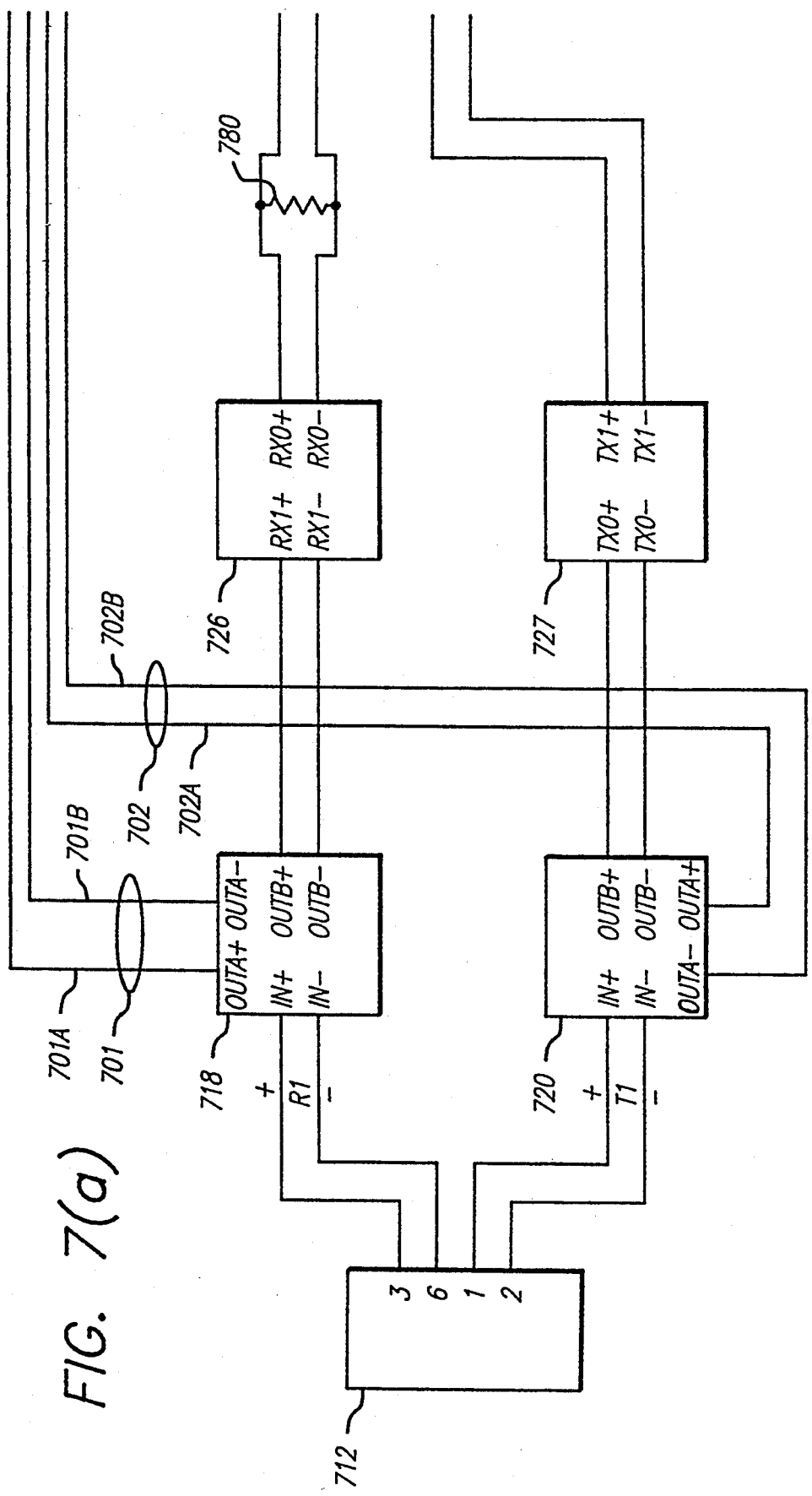
FIGS. 7(a), 7(b), and 7(c) are schematic diagrams of the preferred embodiment of the present invention.
Figure 7B:
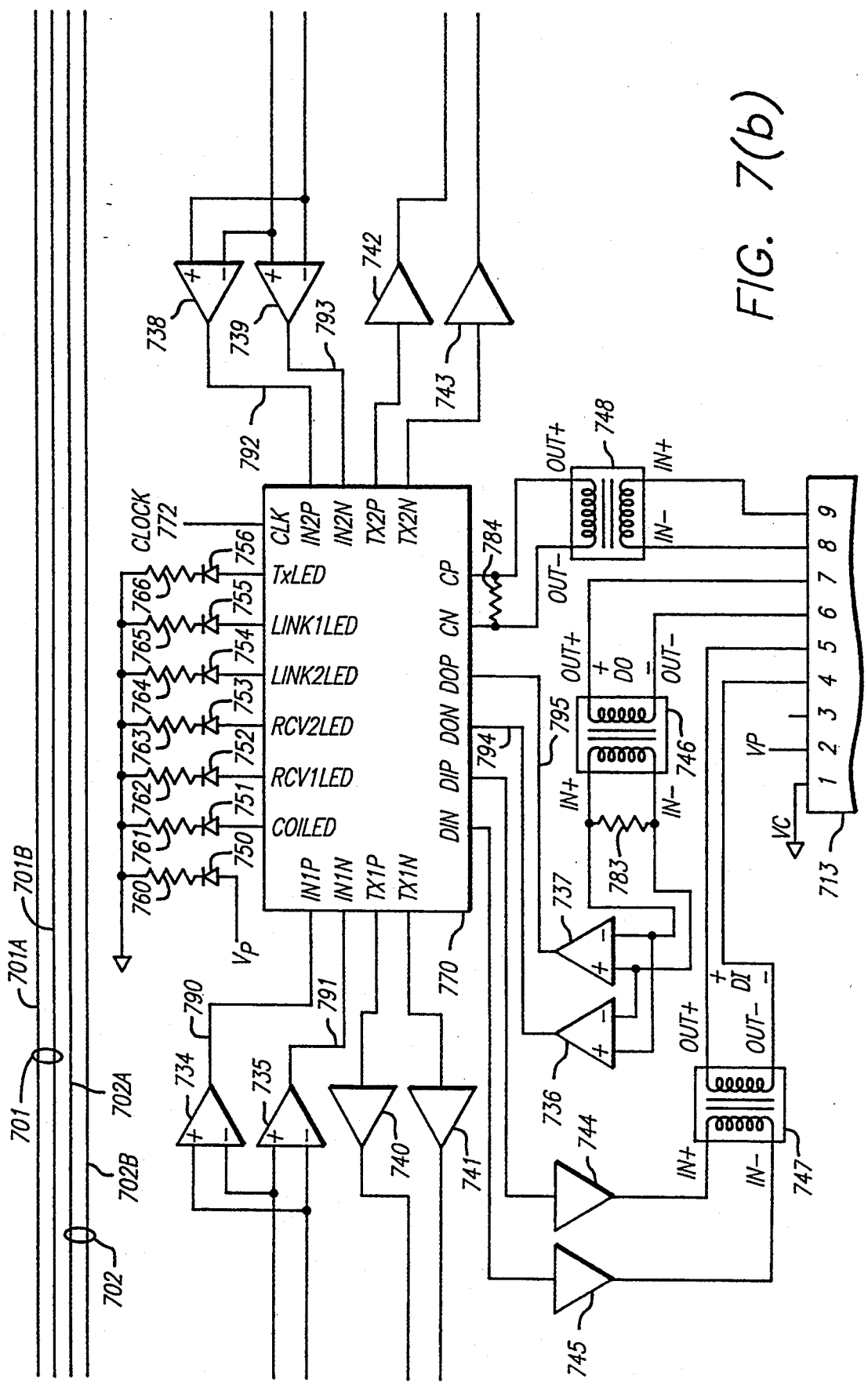
Figure 7C:
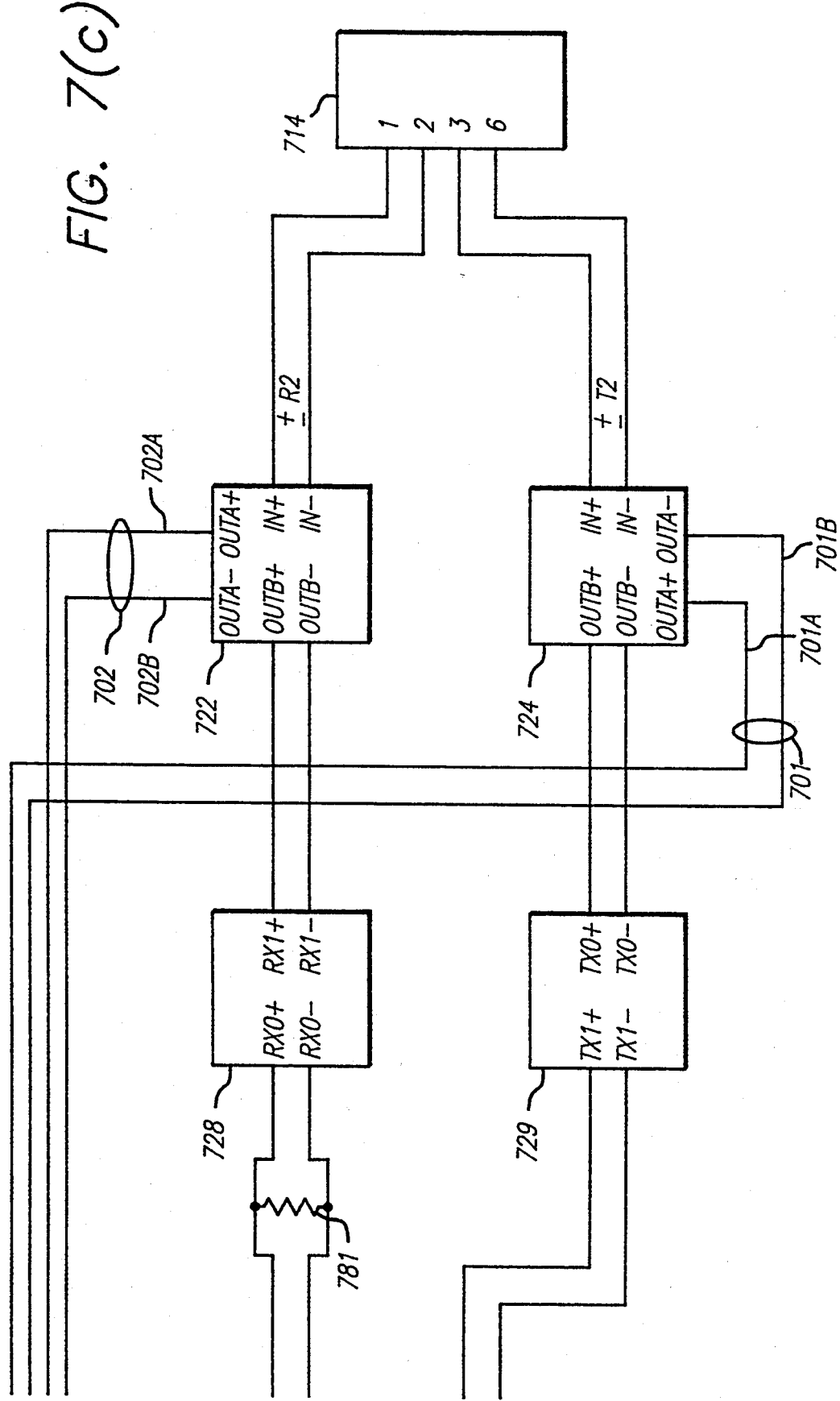

The following description of the operation of the present invention illustrated in FIGS. 7(a), 7(b), and 7(c) is based upon proper powering of the circuit. Signals received on pins 3 and 6 of modular connector 712 pass through relay 718 into the inputs RXI+ and RXI− of filter 726, respectively. Filter 726 suppresses extraneous noise and passes signals having the desired frequency of data signals. The filtered receive signal output between RXO+ and RXO− of filter 726 is connected across resistor 780 thereby preventing reflections from propagating back into the network. Filters 726-728 can be implemented with integrated filter modules (i.e. Valor PT3877) in conjunction with appropriate resistor and capacitor values to make up the transmitter and receiver circuits of the MAU according to the present invention.

Receiver 734 (i.e. 26C32) is wired so that a positive-going signal across the outputs RXO+ and RXO− of filter 726 that exceeds the preset threshold level of receiver 734 triggers it. Receiver 735 is wired so that a negative-going signal across the outputs RXO+ and RXO− of filter 726 that goes below the preset threshold level of receiver 735 triggers it. This produces two output signals 790 and 791 from receivers 734 and 735, respectively, which together indicate whether the received signal is positive, negative or absent (high impedance). These two output signals 790 and 791 are sent to inputs IN1P and IN1N of gate array 770 for processing, respectively. Filter 728 and receivers 738 and 739 operate similarly to produce signals 792 and 793 that are sent to inputs IN2P and IN2N of gate array 770, respectively, based on signals received on modular connector 714.

Receivers 734–739 can be implemented using integrated circuits such as 26C32. When implemented with 26C32 ICs, receivers 734, 735, 738 and 739 require appropriate resistors for each input to isolate the receivers from each other due to resistors 780 and 781 across the outputs RXO+ and RXO− of filters 726 and 728 for absorbing reflections and to set a threshold level for each receiver.

The transmitter section for modular connector 712 comprises line drivers 740 and 741. The outputs TX1P and TX1N of gate array 770 are coupled to line drivers 740 and 741, respectively. Signals TX1P and TX1N indicate positive and negative going polarity data. Filter 727 removes undesired frequencies from the transmitted data according to IEEE Standard 802.3 for 10Base-T Twisted Pair and passes the filtered signals through relay 720 to pins 1 and 2 of connector 712. In a similar fashion, outputs TX2P and TX2N of gate array 770 control line drivers 742 and 743 to produce balanced signals which are sent to pins 3 and 6 of modular connector 714. Line drivers 740–743 can be implemented using integrated circuits such as 74HC365.

Computer equipment connects to the MAU according to the present invention through a standard AUI. The AUI passes through a cable which is rewired to form a nine pin interface which connects to connector 713. Power for the MAU is provided through connector 713 on pins 2 (supply) and 1 (return). The voltage supplied by computer equipment connected to connector 713 powers relays 718, 720, 722 and 724. A passive regulator may be used to convert the voltage across pins 1 and 2 of connector 713 to lower voltages to power circuit elements using an integrated circuit such as an LM7805 and appropriate capacitances.

IEEE Standard 802.3 for 10Base-T Twisted Pair Ethernet defines the AUI as an interface between a MAU and either a DTE or a repeater (i.e. an active hub). It further states that a physical AUI is optional. The AUI consists of several differential signal interchange circuits that are defined by IEEE Standard 802.3 and is used below to describe the present invention and its operation. The interchange circuits are: Data Out (DO), Data In (DI), Control Out (CO), Control In (CI), Voltage Plus (VP) and Voltage Common (VC). The DO circuit is a differential pair that provides encoded data from a DTE. Similarly, the DI circuit is a differential pair, however, encoded data is provided by the MAU. CO and CI are differential pairs that provide encoded control signals sourced by a DTE and a MAU, respectively. VP and VC provide power transfer from a DTE to a MAU.

Data received from the computer equipment appears on receive pair DO where DOP and DON are the differential lines which connect to pins 7 and 6 of connector 713, respectively. After passing through isolation transformer 746, the signal from DO is received using a pair of receivers 736 and 737 in a manner similar to that of receivers 734, 735, 738 and 739 of the two twisted pair interfaces comprising connectors 712 and 713. The outputs 794 and 795 of receivers 736 and 737 are coupled to inputs DON and DOP of gate array 770, respectively, indicating whether a signal from a DTE is received with a positive or negative polarity, respectively. Gate array 770 processes data from the DO circuit.

Data sent to a DTE is passed from gate array 770 on outputs DIP and DIN of gate array 770 to line drivers 744 and 745, respectively. The outputs of line drivers 744 and 745 are passed through isolation transformer 747 to the computer equipment on pins 5 and 4 of connector 713. The DI circuit of the AUI comprises DIP and DIN which are the positive and negative differential lines connected to pins 5 and 4 of connector 713, respectively.

The presence of a collision on the network is indicated to a DTE using the collision signal pair CI of the AUI. The outputs CP and CN of gate array 770 are connected to pins 9 and 8 of connector 713, respectively, through isolation transformer 748. In the case of a collision, a collision signal is generated according to IEEE 802.3 Standard by gate array 770 and passed from outputs CP and CN of gate array 770 to the AUI on the CI circuit comprising CIP and CIN which are the positive and negative differential lines connected to pins 9 and 8 of connector 713, respectively.

The presence of receive signals on connectors 712, 714 and 713 are indicated by three LEDs 752, 753 and 756, respectively. Gate array 770 tests for each condition and outputs Rcv1LED, Rcv2LED and TxLED of gate array 770 enable LEDs 752, 753 and 756, respectively. The presence of good links (as defined in the IEEE Standard 802.3 for 10Base-T) on connectors 712 and 714 are indicated by two LEDs 755 and 754, respectively. Gate array 770 tests for each condition and outputs Link1LED and Link2LED of gate array 770 enable LEDs 755 and 754, respectively. LED 750 indicates a good connection on AUI connection 713 where voltage VP of pin 2 of connector 713 is provided to LED 750. The presence of a collision on the network is indicated by LED 751 which is connected to output COlLED of gate array 770.

The internal logic of gate array 770 contains digital circuitry for processing signals received from any of the three interfaces and routing them to the appropriate interface transmitter. A clock signal 772 is applied to the CLK input of gate array 770 illustrated in FIG. 7(b). This clock signal is referred to as clock signal GCLK in FIGS. 8–14. The present invention includes frequency division circuits implemented with divide-by-N counters well known in the art to provide clock signals having several different frequencies using clock signal 772. Therefore, the circuits for generating these signals are not shown in FIGS. 8–14. The clock signals have a single 50 nS pulse during each period of the clock signal. The following clock signals (the signal period is indicated in parentheses) are generated in gate array 770:NS_300 (period of 300 nS), NS_500 (500 nS), MS_2 (1.84 mS), MS_10 (7.37 mS), MS_20 (22.1 mS), MS_50 (44 mS), MS_100 (88.5 mS), and MS_400 (354 mS).

The Packet Detection section for a twisted pair port of gate array 770 acts as an asynchronous state machine to detect both link pulses and the start of data packets as shown in FIG. 6. Since both link pulses and data packets can begin with the same bit pattern, the packet detection state machine must examine the incoming data continuously (rather than synchronously) so that it can make a decision as soon as possible as to whether incoming data is a link pulse or a data packet.

Over short distances of cable, link pulses can ring below the zero threshold level causing the incoming link pulse pattern to begin with Z-H-L-Z-Z . . . However, incoming data packets often begin with the pattern Z-H-L-H-L . . . where the first three bits of the two patterns are the same. In order to distinguish a data packet from a link pulse, the packet detection state machine looks for a Z-H-L-H pattern which identifies a data packet. In addition, the packet detection state machine looks for a Z-L pattern which is a second bit pattern indicating a data packet. A polarity reversal could cause a link pulse to begin with this pattern. However, it is assumed that either the polarity is correct or it has been corrected elsewhere in the repeater. If only a Z-H-L-Z pattern is received, the packet detection state machine waits for a timeout (described below in the discussion concerning the Link Timeout section of gate array 770) before deciding that a link pulse is detected instead of the start of a data packet.

The Link Status machine notes the reception of link pulses and updates according to IEEE Standard 802.3. The link pulse is not repeated directly out the other side of the MAU, but rather is "eaten" by the Squelch/Link Detect circuitry. A separate Link Pulse Timer generates the link pulses to be sent out to the other twisted pair link from the MAU.

If the incoming data packet also begins with a Z-H-L-H . . . pattern, the Squelch/Link Detect circuitry also truncates the initial two bits H-L, thereby, shortening the packet by two bits. To prevent this from occurring at every MAU in the daisy-chain, the data packet sent out to the twisted pair link by the first MAU is modified so that it always begins with a Z-L . . . pattern which each subsequent MAU in the chain always recognizes as a data packet. Since the data packets tend to get shortened anyway, the MAU replaces the first H bit in the data packet with an L, thereby, turning the Z-H-L-H-L-H . . . bit sequence into Z-Z-Z-L-L-H . . . The next MAU according to the present invention has two bit times to recognize the incoming data packet.

Figure 8:
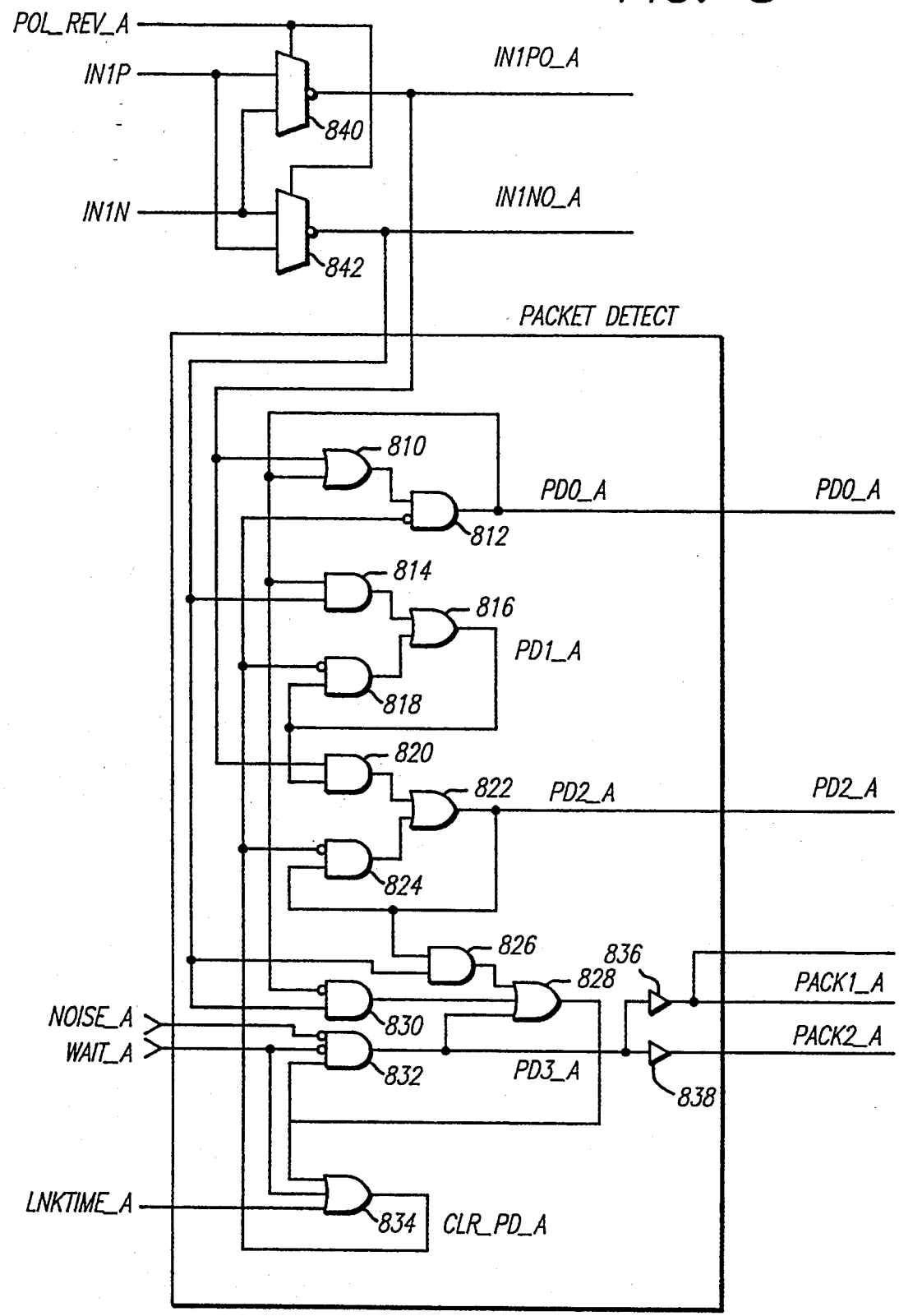
FIG. 8 is a detailed schematic of a Packet Detect state machine implemented using a Gate Array in the preferred embodiment of the present invention for a 10Base-T network port.
Figure 11A:
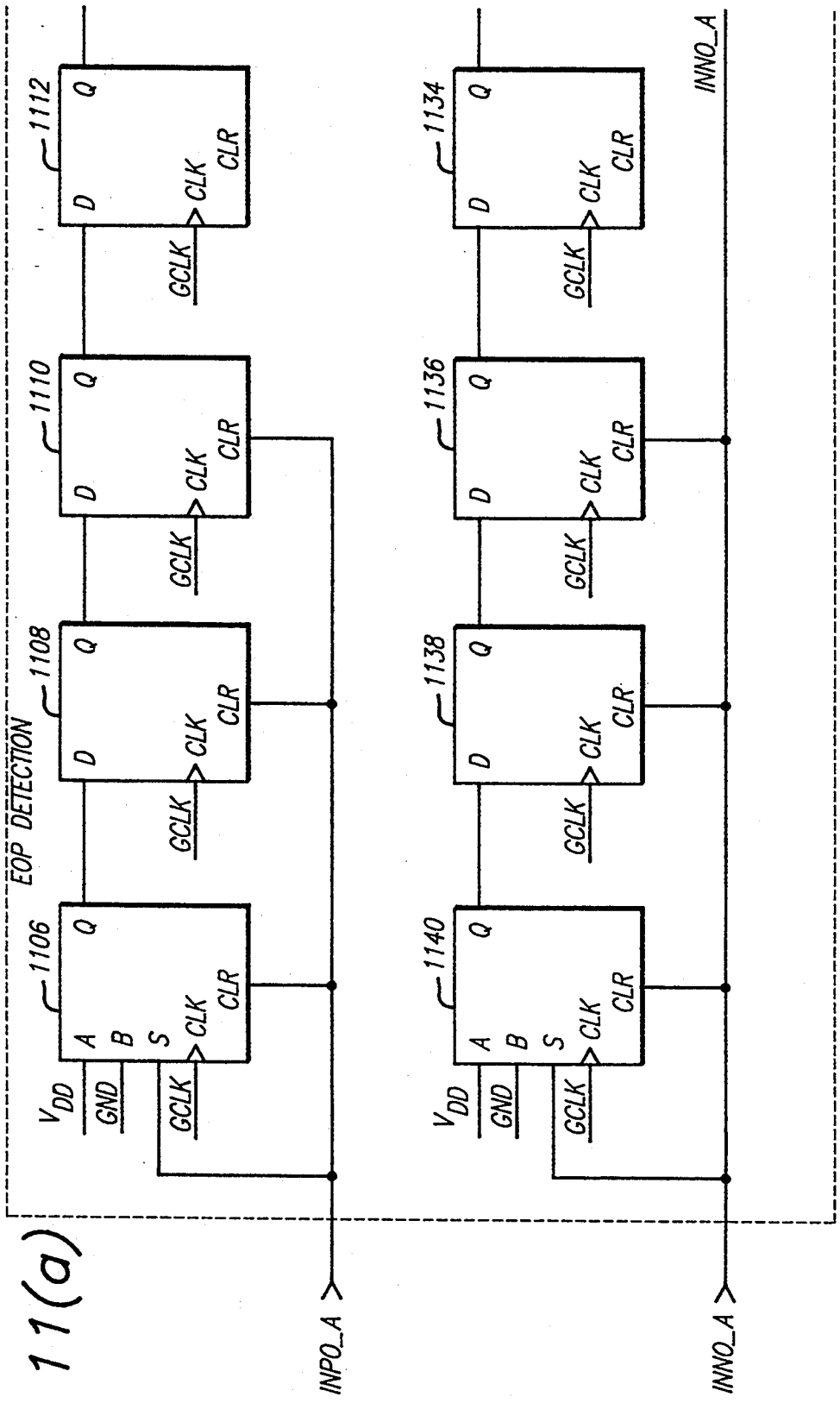
Figure 11B:
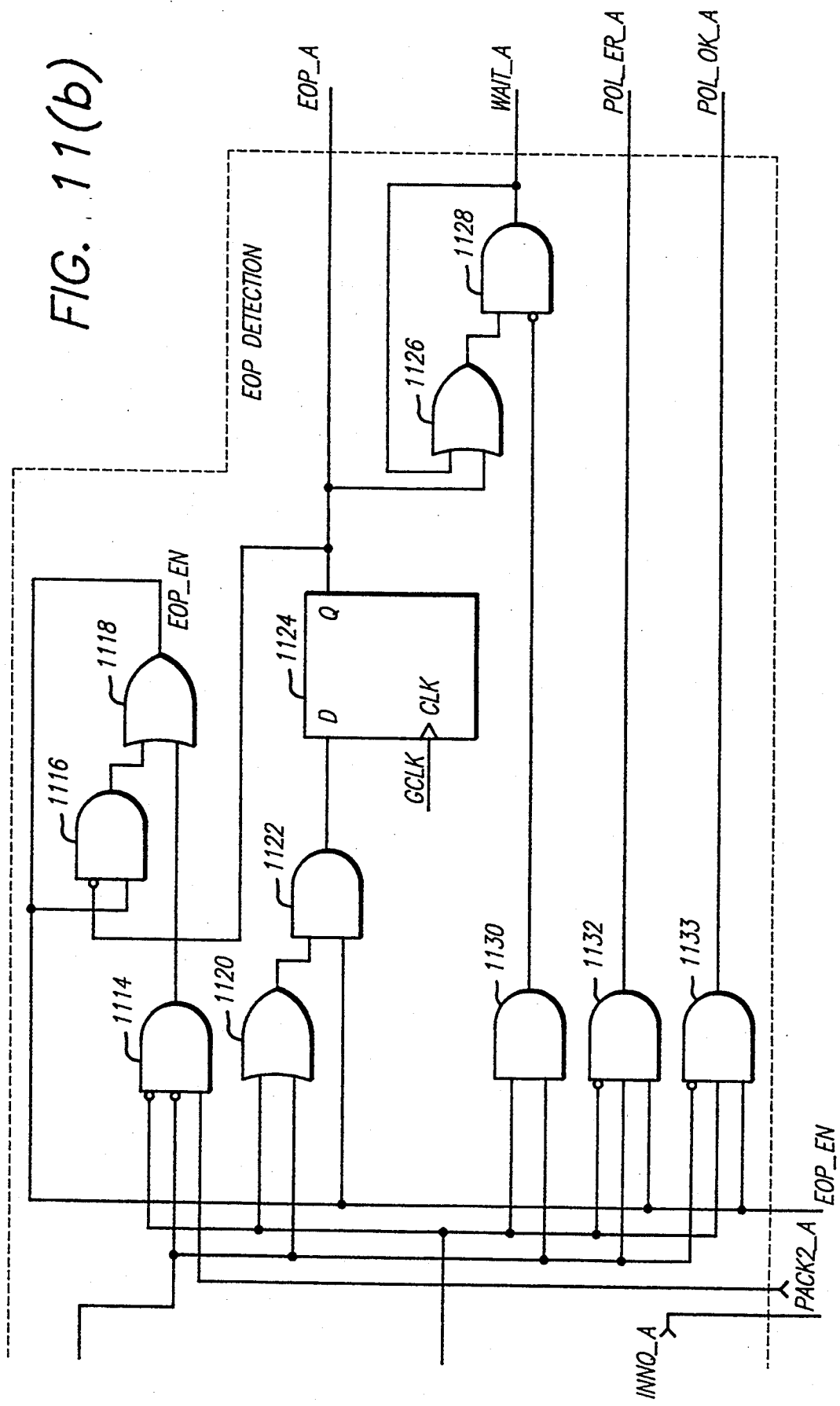
Figure 11C:
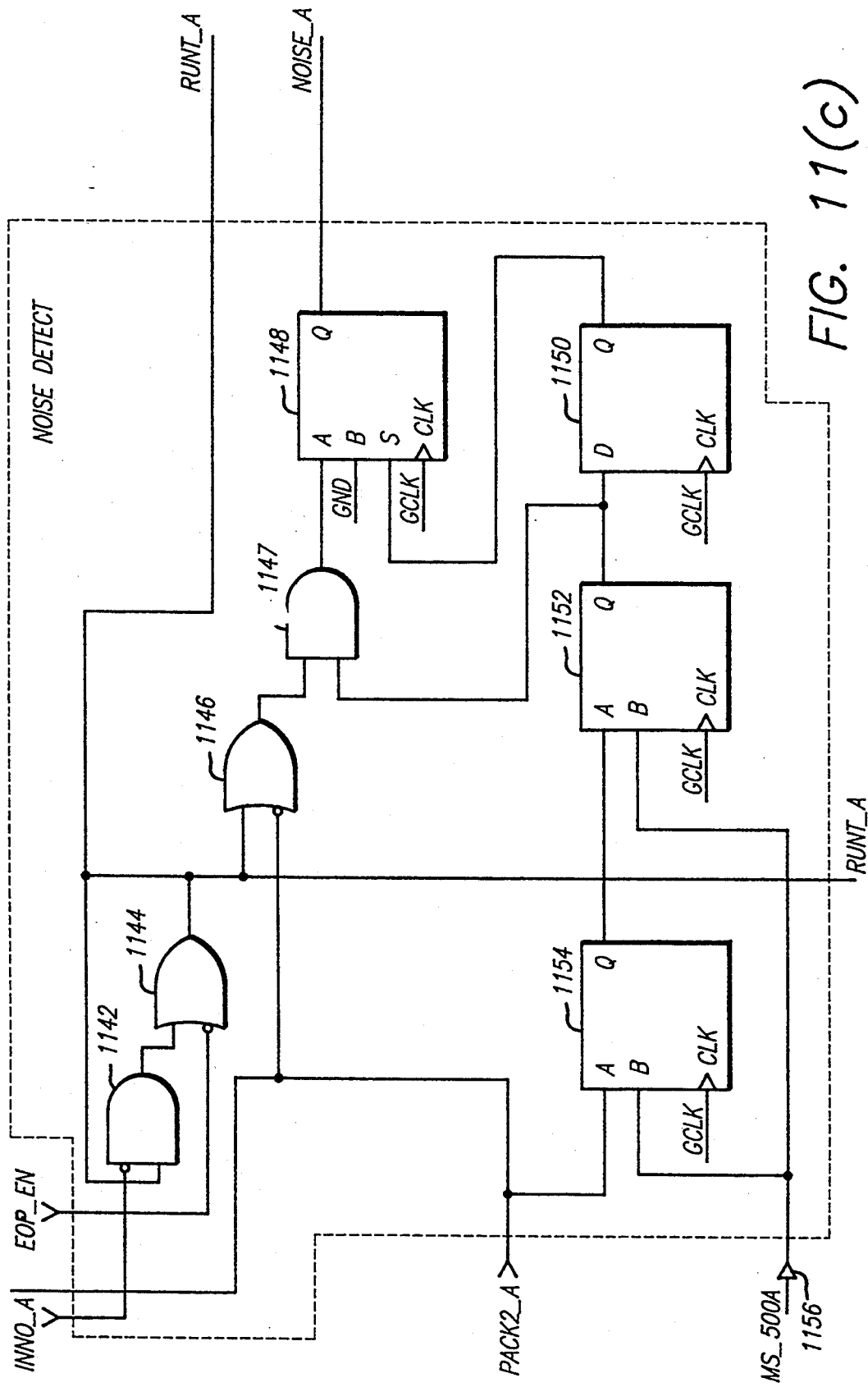
Figure 11D:
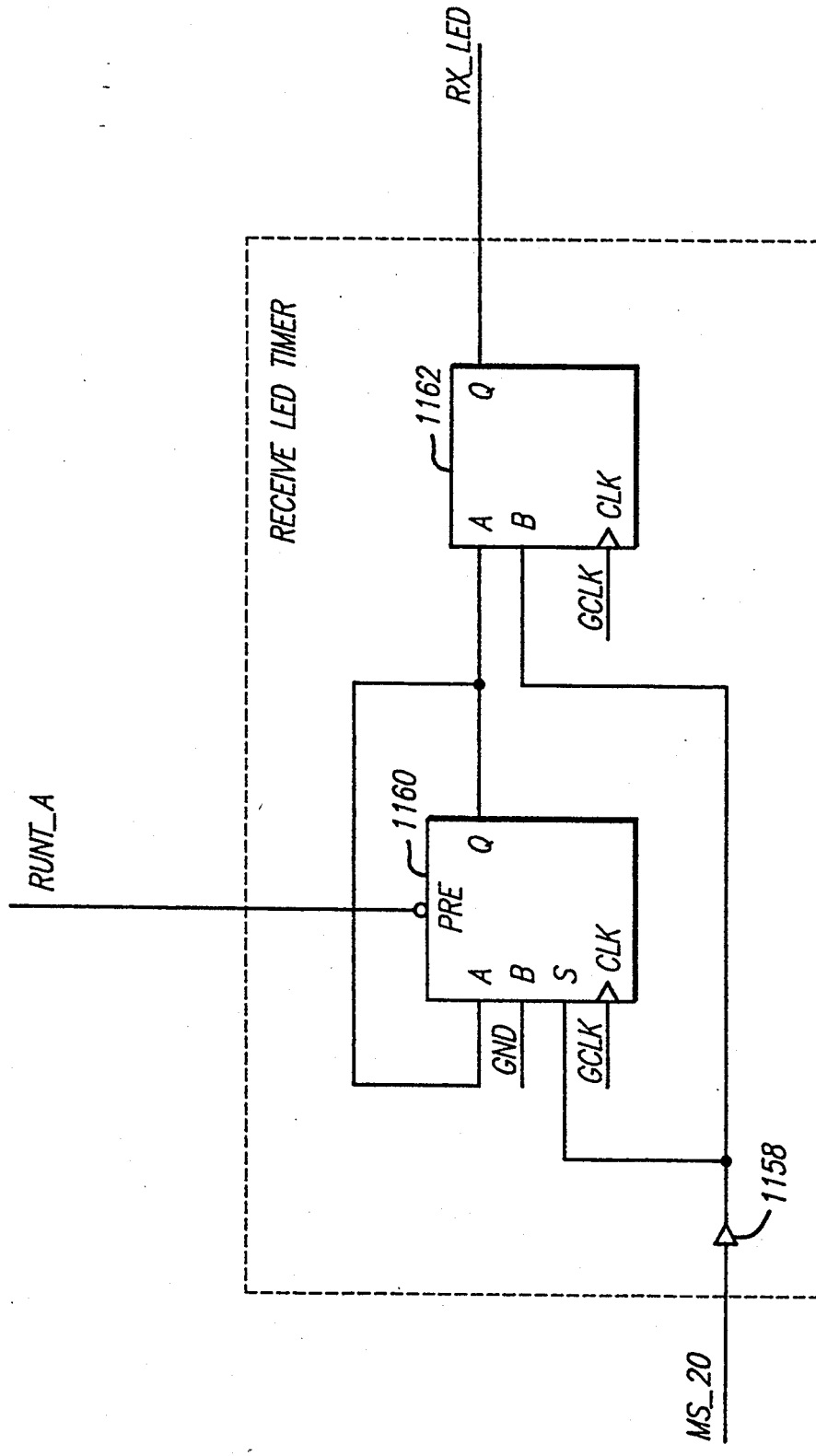

FIG. 8 is a detailed drawing illustrating the circuitry of the Packet Detect circuitry. Input signal IN1P is coupled to a first input of multiplexer 840 and to a second input of multiplexer 842. Input signal IN1N is coupled to a second input of multiplexer 840 and to a first input of multiplexer 842. A signal POL_REV_A is coupled to a select input of multiplexers 840 and 842. Signal POL_REV_A is provided by flip-flop 1622 illustrated in FIG. 16. The inverted output IN1P0_A of multiplexer 840 is coupled to an input of OR gate 810 and an input of AND gate 820. The inverted output IN1N0_A of multiplexer 842 is coupled to an input of AND gate 814, an input of AND gate 826, and an input of AND gate 830. A signal NOISE_A provided by the Q output of flip-flop 1148 of the Noise Detect section illustrated in FIG. 11 is coupled to a negated input of AND gate 832. A signal WAIT_A provided by the output of AND gate 1128 of the EOP Detection section illustrated in Figure 11(b) is coupled to another negated input of AND gate 832 and an input of OR gate 834. A signal LNKTIME_A provided by the output of AND gate 928 of the Link Timeout Section illustrated in FIG. 9(b) is coupled to an input of OR gate 834.

Output CLR_PD_A of OR gate 834 is coupled to a negated input of AND gate 824, a negated input of AND gate 818 and a negated input of AND gate 812. The output of OR gate 810 is coupled to an input of AND gate 812. The output PD0_A of AND gate 812 is coupled to an input of OR gate 810, an input of AND gate 814 and a negated input of AND gate 830. The output of AND gate 814 is coupled to an input of OR gate 816. The output PD1_A of OR gate 816 is coupled to an input of AND gate 818 and an input of AND gate 820. The output of AND gate 818 is coupled to an input of OR gate 816.

The output of AND gate 820 is coupled to an input of OR gate 822. Output PD2_A of OR gate 822 is coupled to an input of AND gate 824 and an input of AND gate 826. The output of AND gate 824 is coupled to an input of OR gate 822. The output of AND gate 826 is coupled to an input of OR gate 828. The output of AND gate 830 is coupled to an input of OR gate 828. The output of AND gate 832 is coupled to an input of OR gate 828. The output PD3_A of OR gate 828 is coupled to an input of AND gate 832 and an input of OR gate 834. The output of AND gate 832 is coupled to an input of buffer 836 and to an input of buffer 838. The output of buffer 836 is signal PACK1_A and the output of buffer 838 is signal PACK2_A.

The Packet Detect state machine is built with RS latches. Because the gate array (ACTEL) does not provide an RS latch macro, each latch is built using AND and OR gates with a feedback path. There are four stages in the state machine labelled PD0_A-PD3_A shown in FIG. 8. The operation of the Packet Detect state machine is discussed below assuming that it starts in the idle state having all LOWs.

If a negative-going signal is received, IN1N goes LOW causing output PD3_A of AND gate 832 to become HIGH. This indicates reception of a packet. The output PD3_A being HIGH clears and holds clear the outputs PD0_A-PD2_A by causing output CLR_PD_A to be HIGH. The output PD3_A remains latched until a signal WAIT_A is received indicating that the end of packet has been detected and the repeater is waiting for the line to settle. If a positive-going signal is detected, IN1P goes LOW causing PD0_A to go HIGH. PD0_A being HIGH enables the next latch having output PD1_A which is looking for IN1N to go LOW. When the incoming signal falls below −400 mV, IN1N goes LOW and the output PD1_A of OR gate 816 becomes HIGH. The output PD1_A then enables the next latch having output PD2_A which is waiting for a positive signal again (IN1P is LOW).

At this point the data packet received could be either a data packet or a link pulse. If the state machine stays in this state for longer than 100 nS, the output LNKTIME_A of the Link Timeout section shown in FIG. 9 resets the state machine to the idle state. Timing out LNKTIME_A also sends a pulse to the Link Status state machine shown in FIG. 10 which keeps track of the state of the twisted pair link. If the incoming data goes positive once again, IN1P goes LOW and sets the output PD2_A of the third RS latch comprising AND gates 820 and 824 and OR gate 822. At this point, the incoming data must be a data packet.

The Packet Detect state machine prefers incoming data packets to start with a negative transition. To aid other MAUs according to the present invention further down the chain, it is preferable to start all packets with a negative pulse (L) for the first transmitted bit. This beginning negative pulse is lengthened by beginning to transmit a negative signal immediately after output PD2_A is set HIGH. This compensates for shortening of the first bit by MAU links that are down the chain (the IEEE Standard 802.3 for 10Base-T Twisted Pair allows phase violations for the first bit).

With output PD2_A set HIGH, the next negative transition sets output PD3_A to HIGH. This first clears the other bits of the Packet Detect state machine by setting output CLR_PD_A to HIGH. With output PD2_A cleared and PD3_A set HIGH, data is sent out instead of a "0" (although the data at this point is also a "0"). Output PD2_A also indicates to the rest of the circuitry that a packet has been detected.

FIGS. 9(a), 9(b), 9(c), and 9(d) are block diagrams illustrating Transmit Enable circuitry, a Data In RS Latch, a Link Timeout section, and a Link Validate section. The Data In RS Latch comprises OR gate 902 and AND gates 904 and 906. The inverted output INP-0_A of multiplexer 840 of FIG. 8 is coupled to an input of OR gate 902. The inverted output INN0_A of multiplexer 842 of FIG. 8 is coupled to negated input of AND gate 904. The output of OR gate 902 is coupled to an input of AND gate 904. The output of AND gate 904 is coupled to an input of AND gate 906 and an input of OR gate 902. The output PD2_A of OR gate 822 of FIG. 8 is coupled to an input of OR gate 908 and to a negated input of AND gate 906. The output of AND gate 906 is output signal DIN_A.

The Transmit Enable circuit comprises OR gate 908 and AND gate 910. The output PACK1_A of buffer 836 of FIG. 8 is coupled to an input of OR gate 908. Signal WAIT_A is coupled to a negated input of AND gate 910. A signal LINK_A is coupled to an input of AND gate 910. The output of OR gate 908 is coupled to an input of AND gate 910. The output of AND gate 910 is signal TX_EN_A. An output PD0_A of AND gate 812 of FIG. 8 is coupled to an input of AND gate 930 and an input of OR gate 912.

The Link Timeout section comprises AND gates 922, 928 and 930, OR gates 912 and 932, exclusive-OR gates 914, 918 and 924, and flip-flops 916, 920 and 926. An output PACK1_A of buffer 836 of FIG. 8 is coupled to an input of OR gate 932. The output of OR gate 912 is coupled to an input of exclusive-OR gate 914. The output of exclusive-OR gate 914 is coupled to a D input of flip-flop 916. A clock signal GCLK is input to the CLK input of flip-flop 916. The Q output of flip-flop 916 is coupled to an input of exclusive-OR gate 918, an input of AND gate 922, an input of exclusive-OR gate 914, an input of OR gate 912 and an input of AND gate 928. The output of exclusive-OR gate 918 is coupled to a D input of flip-flop 920. A signal GCLK is coupled to the CLK input of flip-flop 920. The Q output of flip-flop 920 is coupled to an input of AND gate 922, an input of exclusive-OR gate 918, an input of OR gate 912, an input of AND gate 928 and an input of AND gate 930.

The output of AND gate 922 is coupled to an input of exclusive-OR gate 924. The output of exclusive-OR gate 924 is coupled to a D input of flip-flop 926. A signal GCLK is coupled to the CLK input of flip-flop 926. The Q output of flip-flop 926 is coupled to an input of exclusive-OR gate 924, an input of OR gate 912, an input of AND gate 928 and an input of AND gate 930. The output of AND gate 928 is a signal LNKTIME_A. The output of AND gate 930 is a signal LNKFND_A.

The Link Validate section comprises multiplexer 934, OR gates 938, 942, 946 and 952, AND gates 940 and 950, and flip-flops 936, 944, 948 and 954. The output CLRLNK_A of OR gate 932 is coupled to an S input of flip-flops 936, 944, 948 and 954. The CLK input of flip-flops 936, 944, 948 and 954 are coupled to signal GCLK. The B input of flip-flops 936, 944, 948 and 954 are coupled to ground. A clock signal MS_2 is coupled to a select S input of multiplexer 934 and an input of AND gate 940. A data input of multiplexer 934 is coupled to ground. Another data input of multiplexer 934 is coupled to supply voltage $V_{DD}$. A third input of multiplexer 934 is coupled to supply voltage $V_{DD}$. The Q output of flip-flop 944 is coupled to another data input of multiplexer 934. The output of multiplexer 934 is coupled to an A input of flip-flop 936.

The Q output of flip-flop 936 is coupled to an input of AND gate 940, a negated input of OR gate 938 and an S input of multiplexer 934. The output of OR gate 938 is signal L_SHRT_A. The output of AND gate 940 is coupled to an input of OR gate 942. The output of OR gate 942 is coupled to an A input of flip-flop 944. A clock signal MS_50 is coupled to an input of OR gate 946 and an input of AND gate 950. The output of OR gate 946 is coupled to an A input of flip-flop 948. The Q output of flip-flop 948 is coupled to an input of AND gate 950 and an input of OR gate 946. The output of AND gate 950 is coupled to an input of OR gate 952. The output of OR gate 952 is coupled to an A input of flip-flop 954. The output L_LONG_A of flip-flop 954 is coupled to an input of OR gate 952.

The Link Timeout section illustrated in FIG. 9 is a three bit counter comprising flip-flops 916, 920 and 926 which times out 300 nS after any incoming data is received that starts with a positive transition. Thus, signal PD0_A going HIGH enables the counter which continues to count until it rolls over to 000. At any time from 250-300 nS after PD0_A becomes HIGH, the output LNKFND_A of AND gate 930 goes HIGH. If LNKFND_A is still HIGH at the next rising clock of GCLK (300-350 nS after PD0_A goes HIGH), a link pulse is recorded in the Link Status state machine illustrated in FIG. 10. After the next clock (again 300-350 nS after PD0_A goes HIGH), an output LNKTIME_A of AND gate 928 which is coupled to an input of OR gate 834 goes HIGH, thereby, clearing the lower bits of the Packet Detect state machine. If a data packet were being received, it should have been recorded by this time.

Figure 9A:
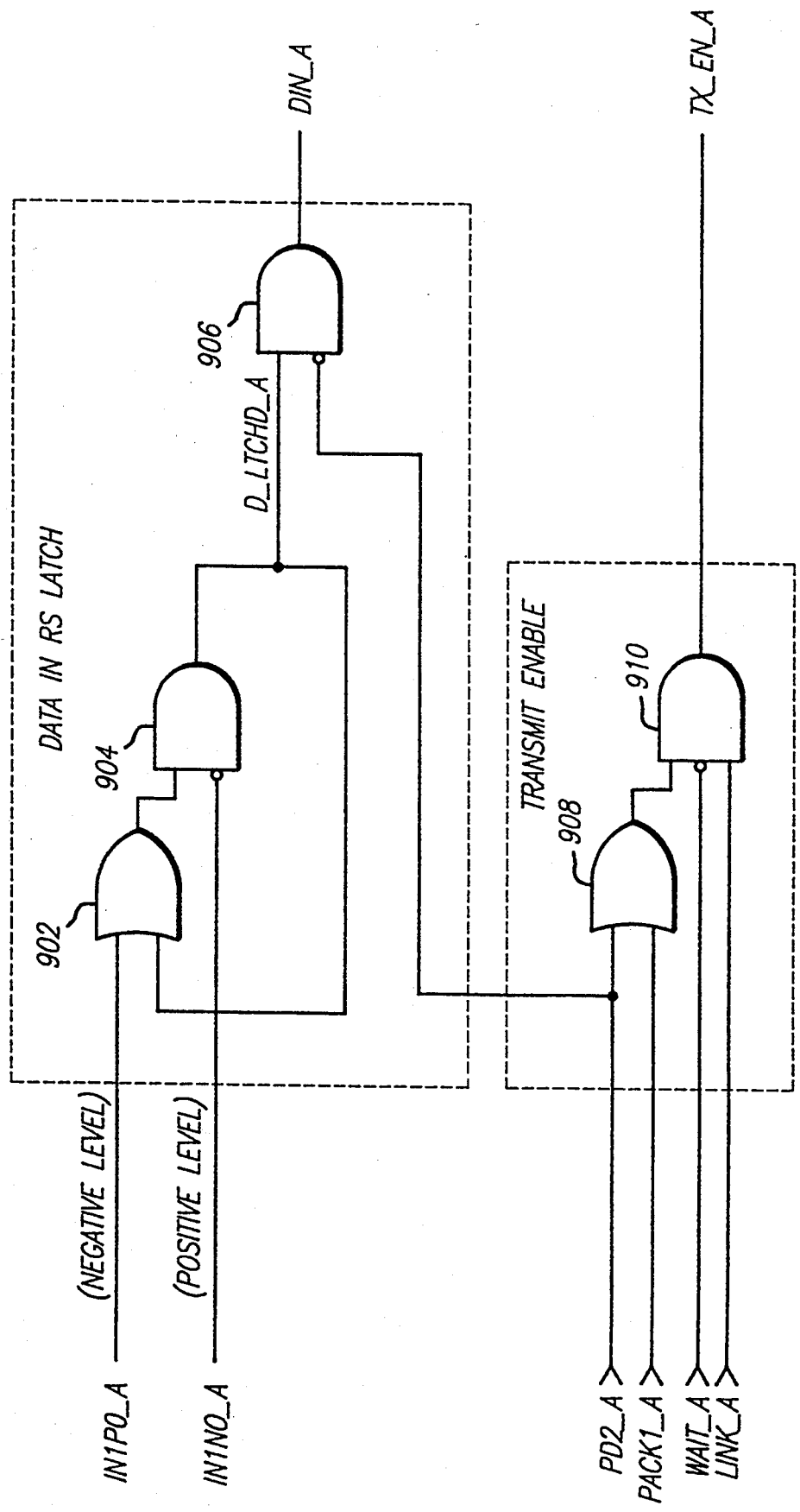
FIGS. 9(a), 9(b), and 9(c) are detailed schematics of Data In Latch section, Transmission Enable Logic, Link Timeout section and Link Validate section implemented using a Gate Array in the preferred embodiment of the present invention for a 10Base-T network port.
Figure 11C:
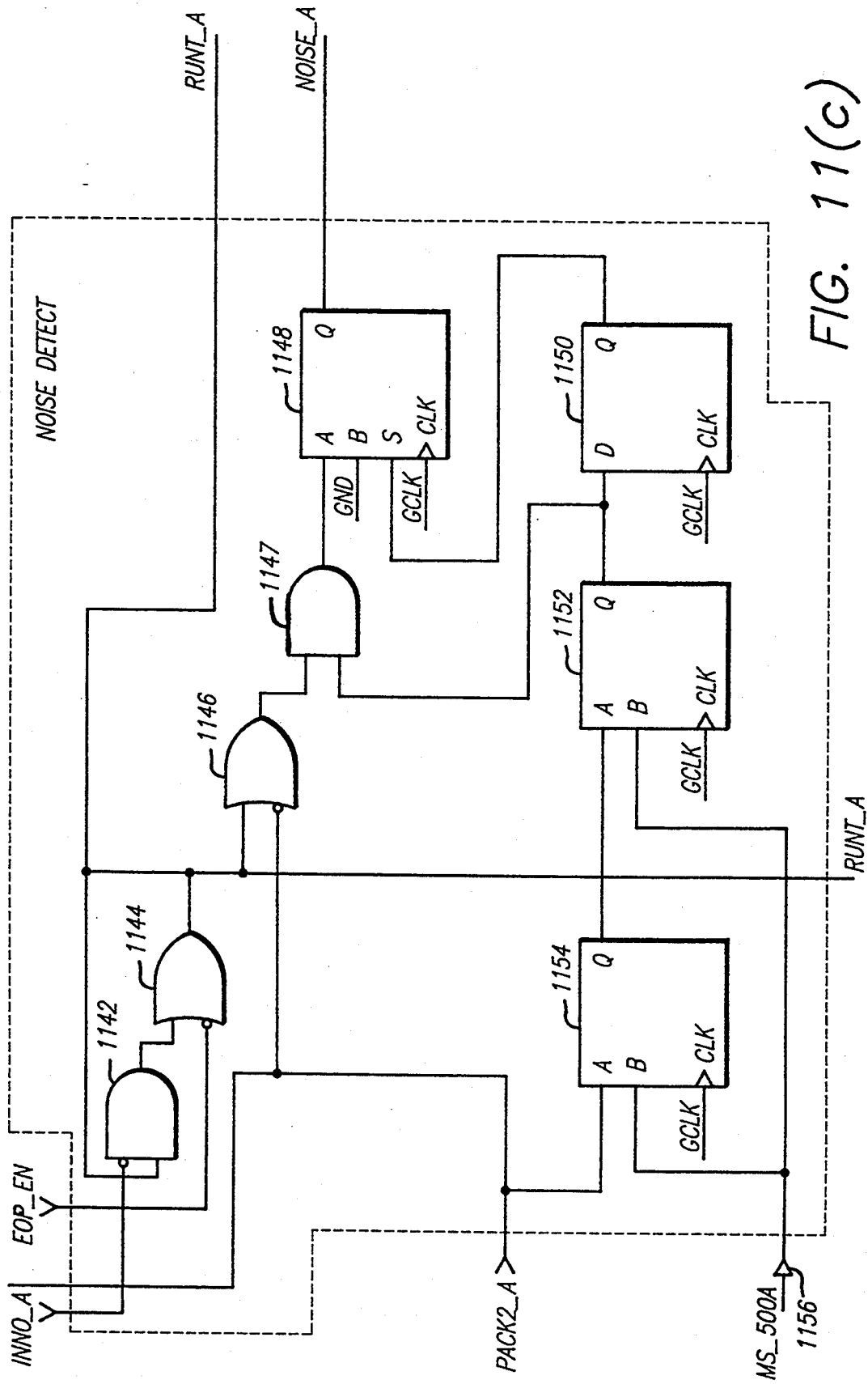
FIGS. 11(a), 11(b), 11(c), and 11(d) are detailed schematics of an EOP section, Noise Detect section and a Receive LED Timer implemented using a Gate Array in the preferred embodiment of the present invention for a 10Base-T network port.
Figure 9C:
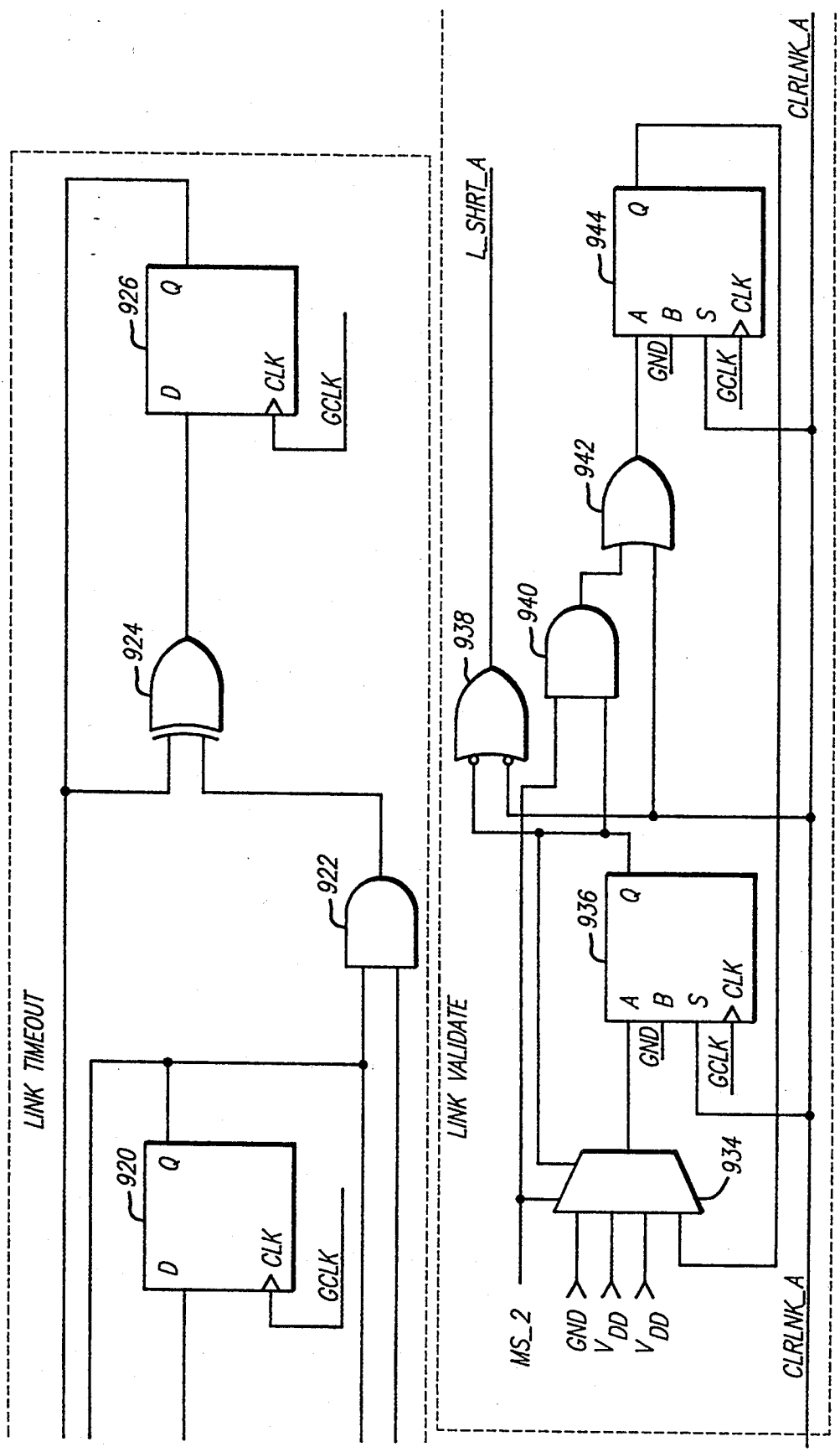
Figure 9D:
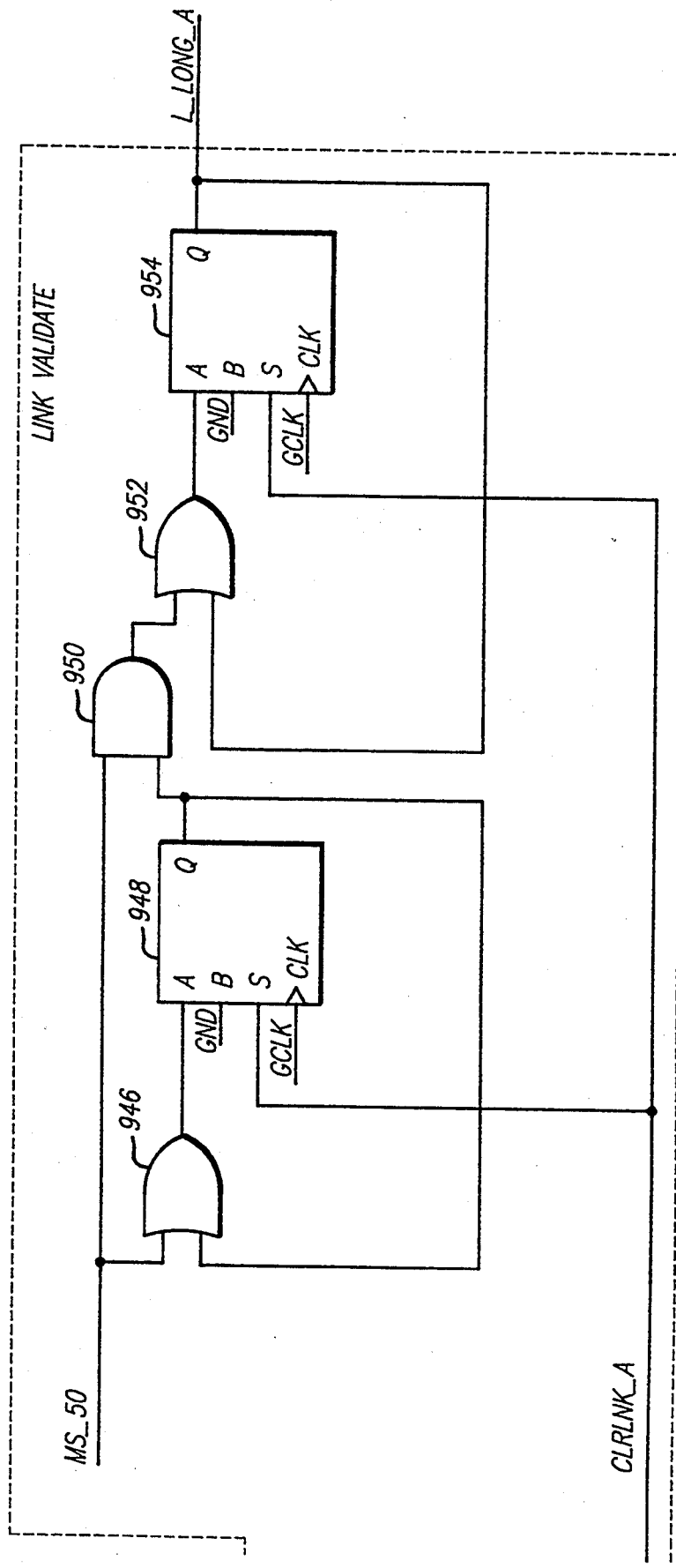

The Link Validate circuit illustrated in FIG. 9(c) and 9(d) consists of two sections: one section to detect when link pulses are too close together producing an output L_SHRT_A and another section to determine when they are too far apart producing an output L_LONG_A. In order to save on modules, the resolution of these two sections has been reduced, but remains within the IEEE Standard 802.3 specification for 10Base-T Twisted Pair. The first section consists of a two bit counter which counts the number of pulses of a clock signal MS_2 since the last link pulse. The clock signal MS_2 sends a pulse every 2 mS, so, by the time that the counter has reached 11 at least 4–6 mS has elapsed since the previous link pulse. Thus, if the counter has reached 11, the incoming link pulse does not occur too close after the previous link pulse (or data packet) and the signal L_SHRT_A (link is too short) becomes LOW. Prior to the counter reaching 11, L_SHRT_A is HIGH.

The second section of the Link Validate circuit insures that at least 50–100 mS has elapsed between link pulses before the link is considered lost. MS_50 is a 50 mS clock having a 50 nS pulse per interval for timing the link fail interval for the Link Status state machine. The first pulse from MS_50 sets the Q output of flip-flop 948 to HIGH and the second pulse sets the output L_LONG_A of flip-flop 954 (link pulse is too long) to HIGH. Since the pulses are 50 mS apart, 50 mS must elapse before output L_LONG_A is set HIGH. The two signals L_LONG and L_SHRT_A are coupled to the Link Status state machine shown in FIG. 10.

Figure 10:
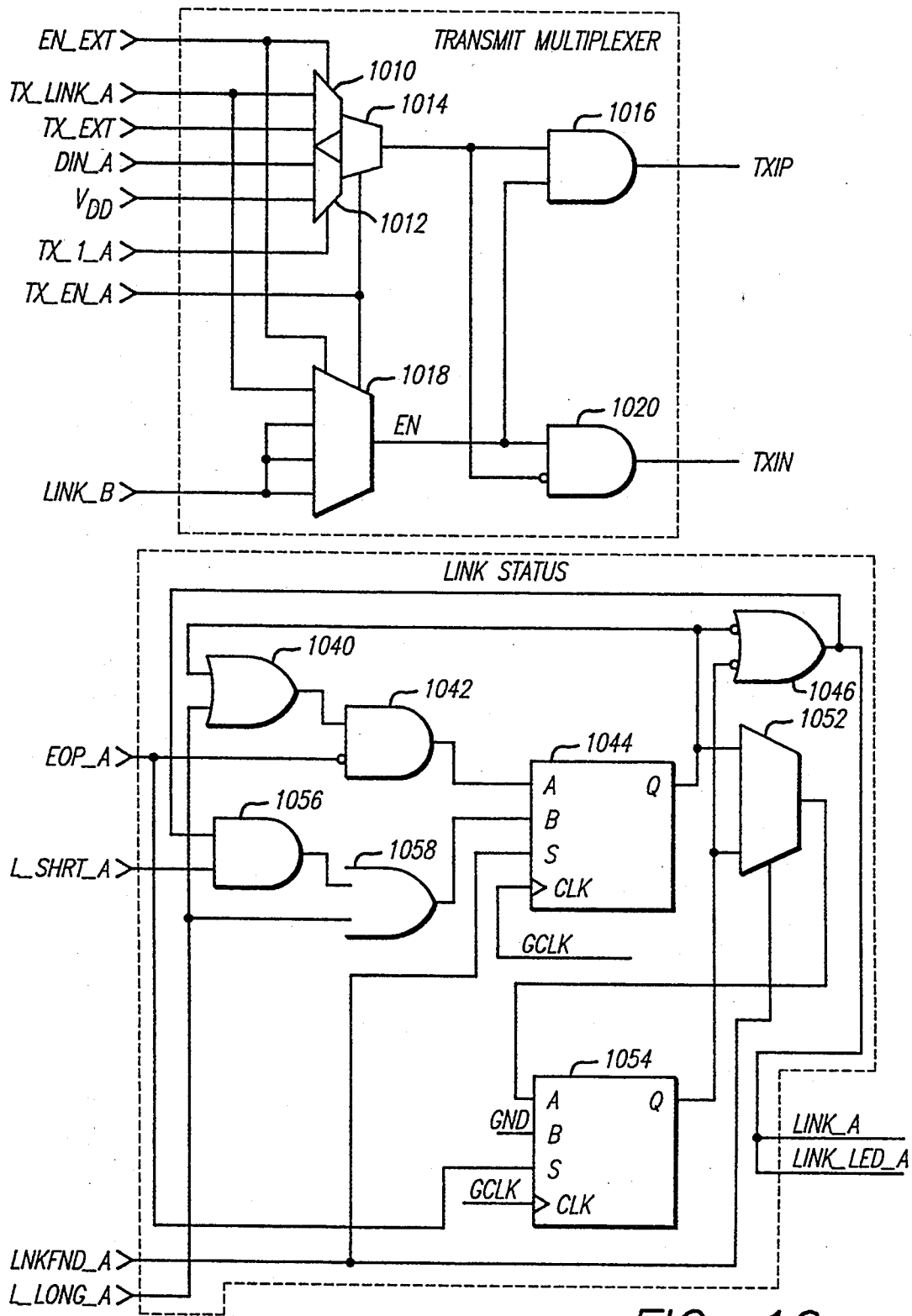
FIG. 10 is a detailed schematic of Transmit Multiplexer section and Link Status state machine implemented using a Gate Array in the preferred embodiment of the present invention for a 10Base-T network port.

FIG. 10 is a detailed drawing of a Transmit Multiplexer and Link Status section. The Transmit Multiplexer comprises multiplexers 1010, 1012, 1014 and 1018. A signal EN_EXT is connected to a select input of multiplexer 1010 and a select input of multiplexer 1018. A signal TX_LINK_A is coupled to a data input of multiplexer 1010 and a data input of multiplexer 1018. A signal TX_EXT is coupled to a data input of multiplexer 1010. A signal DIN_A is coupled to a data input of multiplexer 1012. An input of multiplexer 1012 is connected to supply voltage $V_{DD}$. A signal TX_1_A is coupled to a select input of multiplexer 1012. A signal TX_EN_A is coupled to a select input of multiplexer 1014 and to a select input of multiplexer 1018. A signal LINK_B is coupled to three data inputs of multiplexer 1018. The output of multiplexer of 1014 is coupled to an input of AND gate 1016 and negated input of AND gate 1020. The output of AND gate 1016 is signal TX1P. The output of multiplexer 1018 is coupled to an input of AND gates 1016 and 1020. The output of AND gate 1020 is a signal TX1N.

The Link Status section comprises OR gates 1040 and 1058, AND gates 1042, 1046 and 1056, flip-flops 1044 and 1054, and multiplexer 1044. A signal EOP_A is coupled to a negated input of AND gate 1042 and to an S input of flip-flop 1054. A signal L_SHRT_A is coupled to an input of AND gate 1056. A signal LNKFND_A is coupled to an S input of flip-flop 1044 and to a select input of multiplexer 1052.

A signal L_LONG_A is coupled to an input of OR gate 1058 and an input of OR gate 1040. The output of OR gate 1040 is coupled to an input of AND gate 1042. The output of AND gate 1042 is coupled to an A input of flip-flop 1044. The output of AND gate 1056 is coupled to an input of OR gate 1058. The output of OR gate 1058 is coupled to a B input of flip-flop 1044. A signal GCLK is coupled to a CLK input of flip-flop 1044. The output of AND gate 1046 is coupled to a negated input of AND gate 1056. The output of AND gate 1046 is a signal LINK_A and a signal LINK_LED_A.

The Link Status state machine follows the algorithm for determining the state of a link between two nodes that is described in IEEE Standard 802.3 specification. If the time elapsed between link pulses or packets exceeds 50–150 mS, the state machine enters the fail state. Once in this state, two link pulses must be received in a row which are neither too close together (less than 6 mS) nor too far apart (50–150 mS) to reset the Link Status state machine to the link good state. Alternatively, a packet also resets it to the link good state.

The Link Status machine uses signals LNKFND, EOP, L_LONG_A and L_SHRT_A to determine the state of the link between two nodes. An EOP signal resets the state to good causing output LINK_A to become HIGH. The L_SHRT_A signal is ignored unless the state is link fail. L_LONG_A indicates that a link pulse is missing thereby setting the Q output of flip-flop 1044 to HIGH, and putting the state machine in the link fail state causing output LINK_A to become LOW. If the Q output of flip-flop 1044 is already set HIGH, a LNKFND_A and L_SHRT_A pulse keeps it set HIGH. If a LNKFND_A pulse occurs with signals L_SHRT_A and L_LONG_A both LOW, the Q output of flip-flop 1044 is cleared to LOW indicating that the first good link pulse has been found by setting output LINK_A to HIGH.

The state of flip-flop 1044 is clocked into flip-flop 1054 each time a link pulse is found (LNKFND_A). Thus, only after two consecutive good link pulses (or one EOP signal which always resets both bits of the Link Status state machine) both Q outputs of flip-flops 1044 and 1054 are cleared. When both Q outputs of flip-flops 1044 and 1054 are cleared, the Link Status state machine is in the link good state having output LINK_A set HIGH. The link LED is lit by output LINK_LED indicating a link good state, and packets are again relayed.

Figure 12:
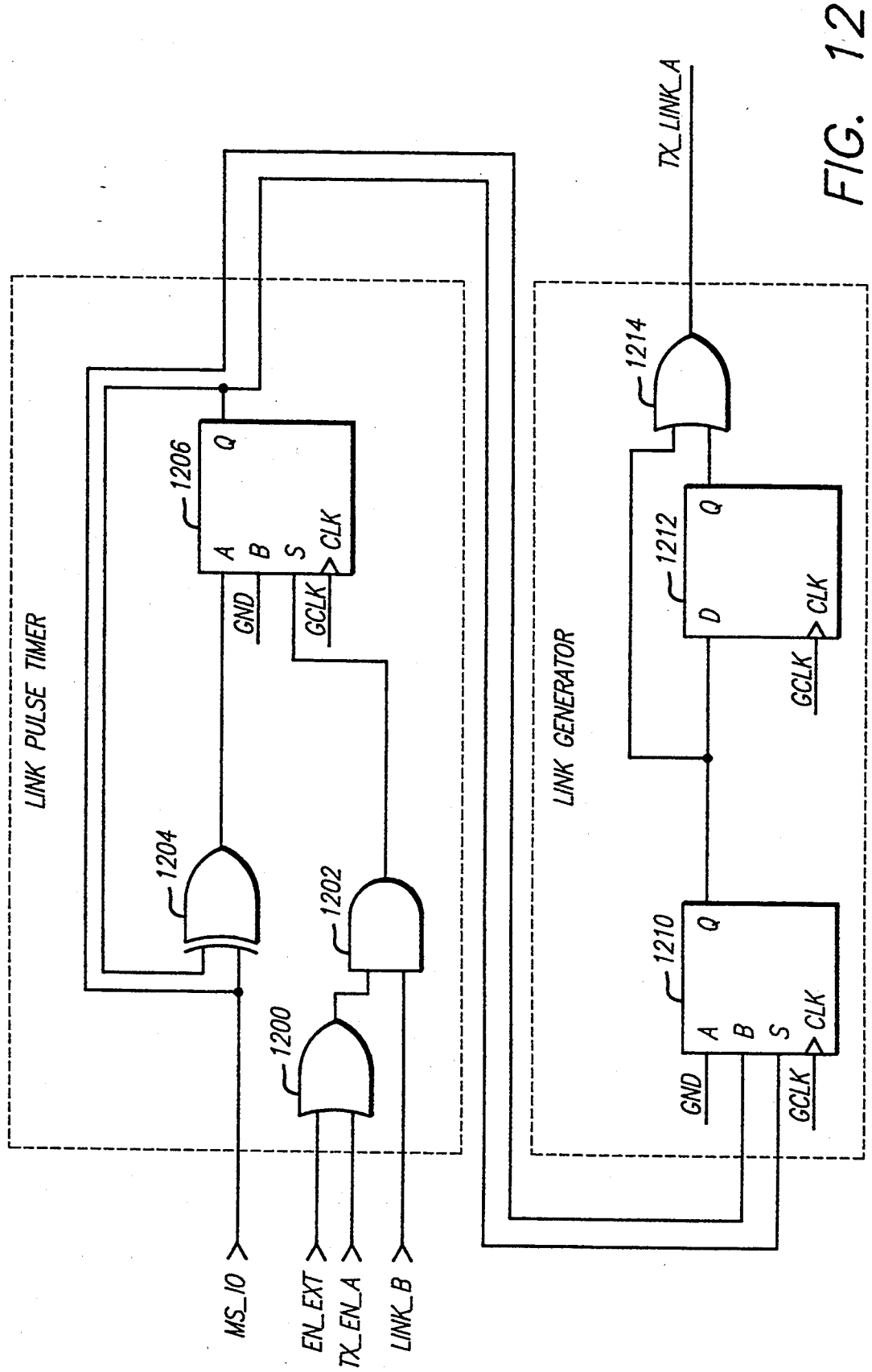
FIG. 12 is a detailed schematic of an Link Pulse Timer and a Link Generator implemented using a Gate Array in the preferred embodiment of the present invention for a 10Base-T network port.

FIG. 12 is a detailed drawing illustrating a Link Pulse Timer section and a Link Generator circuit of the present invention. The Link Pulse Timer comprises exclusive-OR gate 1204, OR gate 1200, flip-flop 1206 and AND gate 1202. A clock signal MS_10 is coupled to an input of exclusive-OR gate 1204 and a B input of flip-flop 1210. A signal EN_EXT is coupled to an input of OR gate 1200. A signal TX_EN_A is coupled to an input of OR gate 1200. A signal LINK_B is coupled to an input of AND gate 1202. The output of OR gate 1200 is coupled to an input of AND gate 1202. The output of AND gate 1202 is coupled to an S input of flip-flop 1206. The output of exclusive-OR gate 1204 is coupled to an A input of flip-flop 1206. The B input of flip-flop 1206 is coupled to ground. The CLK input of flip-flop 1206 is coupled to clock signal GCLK. The Q output of flip-flop 1206 is coupled to an S input of flip-flop 1210 and an input of exclusive-OR gate 1204.

The Link Generator comprises OR gate 1214 and flip-flops 1210 and 1212. The CLK inputs of flip-flops 1210 and 1212 are coupled to a clock signal GCLK. The A input of flip-flop 1210 is coupled to ground. The Q output of flip-flop 1210 is coupled to the D input of flip-flop 1212 and an input of OR gate 1214. The Q output of flip-flop 1212 is coupled to an input of OR gate 1214. The output of OR gate 1214 is a signal TX_LINK_A.

The Link Pulser Timer section illustrated in FIG. 12 insures that a link pulse is sent out every 20 mS. The clock signal MS_10 is a 10 mS clock having a 50 nS pulse per interval for timing the interval between link pulses. It sends a pulse every 10 ms which toggles the Q output of flip-flop 1206. When the Q output of flip-flop is HIGH and another MS_10 pulse arrives, the output of the Link Pulse Timer is set HIGH causing the Link Generator flip-flop 1210 to be set HIGH. Flip-flops 1210 and 1212 together stretch the 50 nS pulse width of the Link Pulse Timer output to 100 nS. The signal TX_LINK_A enables the line driver 740 and forces the data to "1" forming a link pulse. To insure that a link does not occur within 10 mS of a packet and especially during one, the packet detect signal EN_EXT and TX_EN resets flip-flop 1206 of the Link Pulse Timer section.

Once a packet has been found, the contents of the packet are relayed out through the output of multiplexer 1014 until the end of packet (EOP) is detected. EOP is detected when the incoming data remains either HIGH or LOW for longer than 150 nS. If the polarity of the incoming data is correct or has been corrected by another portion of the repeater, the data output by multiplexer 1014 is always HIGH at EOP. Once EOP is found, the output of multiplexer 1014 is forced to a "1" and the output signal EN of multiplexer 1018 is held HIGH for an additional 50 nS. This insures the length of the EOP signal remains in the range of 200 to 250 nS. Any further data is ignored until both the IN1N and IN1P inputs indicate an idle line.

FIGS. 11(a), 11(b), 11(c), and 11(d) are detailed drawings illustrating an EOP Detection circuit, a Noise Detect section and a Receive LED Timer section of the present invention. EOP Detection section comprises flip-flops 1106–1112, 1124 and 1134—1140, AND gates 1114, 1116,1122, 1128, 1130, 1132 and 1133, and OR gates 1118, 1120 and 1126. An input INP0_A is connected to an S input of flip-flop 1106 and CLR inputs of flip-flops 1106, 1108 and 1110. An input signal INN0_A is coupled to an S input of flip-flop 1140, CLR inputs of flip-flops 1140, 1138 and 1136, and a negated input of AND gate 1142.

An input signal PACK2_A is coupled to a D input of flip-flop 1154, an input of AND gate 1114 and a negated input of OR gate 1146. Input A of flip-flop 1106 is connected to supply voltage $V_{DD}$ and input B of flip-flop 1106 is coupled to ground. The Q output of flip-flop 1106 is coupled to the D input of flip-flop 1108. The Q output of flip-flop 1108 is coupled to the D input of flip-flop 1110. The Q output of flip-flop 1110 is coupled to the D input of flip-flop 1112. The Q output of flip-flop 1112 is coupled to a negated input of AND gate 1114, an input of OR gate 1120, an input of AND gate 1130, an input of AND gate 1132, and a negated input of AND gate 1133. The A input of flip-flop 1140 is coupled to supply voltage $V_{DD}$ and the B input of flip-flop 1140 is coupled to ground. The Q output of flip-flop 1140 is coupled to the D input of flip-flop 1138. The Q output of flip-flop 1138 is coupled to the D input of flip-flop 1136. The Q output of flip-flop 1136 is coupled to the D input of flip-flop 1134. The Q output of flip-flop 1134 is coupled to a negated input of AND gate 1132, an input of AND gate 1130, an input of OR gate 1120, negated input of AND gate 1114, and an input of AND gate 1133.

The output of AND gate 1114 is coupled to an input of OR gate 1118. The output of AND gate 1116 is coupled to an input of OR gate 1118. The output of OR gate 1118 is coupled to an input of AND gate 1116, an input of AND gate 1122, an input of AND gate 1132, a negated input of OR gate 1144 and an input of AND gate 1133. The output of OR gate 1120 is coupled to an input of AND gate 1122. The output of AND gate 1122 is coupled to a D input of flip-flop 1124. The CLK input of flip-flop 1124 is coupled to signal GCLK. The Q output of flip-flop 1124 is coupled to a negated input of AND gate 1116 and an input of OR gate 1126. The Q output of flip-flop 1124 is signal EOP_A. The output of OR gate 1126 is coupled to an input of AND gate 1128.

The output of AND gate 1130 is coupled to a negated input of AND gate 1128. The output of AND gate 1128 is coupled to an input of OR gate 1126. The output of AND gate 1128 is a signal WAIT_A. The outputs of AND gates 1132 and 1133 are signals POL_ER_A and POL_OK_A, respectively.

Noise Detect section comprises flip-flops 1148, 1150, 1152 and 1154, AND gates 1142 and 1147, and OR gates 1144 and 1146. The E inputs of flip-flops 1152 and 1145 are coupled to clock signal NS_500. The CLK inputs of flip-flops 1152 and 1154 are coupled to clock signal GCLK. The Q output of flip-flop 1154 is coupled to D input of flip-flop 1152. The Q output of flip-flop 1152 is coupled to a D input of flip-flop 1150 and an input of AND gate 1147. The output of AND gate 1150 is coupled to an S input of flip-flop 1148. The output RUNT_A of OR gate 1144 is coupled to an input of AND gate 1142, an input of OR gate 1146 and a preset input of flip-flop 1160. The output of OR gate 1146 is coupled to an input of AND gate 1147. The output of AND gate 1147 is coupled to a A input of flip-flop 1148. The B input of flip-flop 1148 is coupled to ground. The Q output of flip-flop 1148 is a signal NOISE_A.

The Receive LED Timer comprises flip-flops 1160 and 1162. clock signal MS_20 is coupled to an input of buffer 1158. The output of buffer 1158 is coupled to an S input of flip-flop 1160 and an E input of flip-flop 1162. The CLK input of flip-flops 1160 and 1162 are connected to clock signal GCLK. The B input of flip-flop 1160 is coupled to ground. The Q output of flip-flop 1160 is coupled to the A input of flip-flop 1160 and the D input of flip-flop 1162. The Q output of flip-flop 1162 is coupled to a buffer 1164. The output of buffer 1164 is a signal RX_LED2_A.

The LED timers keep the LEDs lighted for at least 20 ms after an event. Flip-flop 1160 is set by an incoming packet which causes RUNT_A to go low at the next negative going pulse after EOP_EN_A goes HIGH thereby preventing inverted link pulses from lighting the LED. The RUNT signal presets flip-flop 1160. The next pulse on MS_20 clocks a HIGH into flip-flop 1162 after 20 mS, lighting the LED with signal RX_LED2_A. Simultaneously, a LOW is clocked into flip-flop 1160. If a packet is still being received, flip-flop will continue to be preset until the packet ends. The first pulse on MS_20 clears flip-flop 1160 and the second pulse clears flip-flop 1162 extinguishing the LED by setting RX_LED_A to LOW.

Eight flip-flops are used to detect an EOP: four flip-flops 1106, 1108, 1110 and 1112 for a positive EOP signal and four flip-flops 1134, 1136, 1138 and 1140 for a negative EOP signal. As long as the incoming data remains above 400 mV, the IN1P signal is LOW and keeps the four Positive EOP Detect flip-flops 1106, 1108, 1110 and 112 reset. Once IN1P goes HIGH, the four flip-flops 1106, 1108, 1110 and 112 begin counting up. If IN1P goes LOW within 150 nS, the fourth flip-flop 1112 is never set HIGH. If IN1P remains HIGH for longer than 150 nS, the Q output of flip-flop 1112 is set HIGH. A similar set of four flip-flops 1134, 1136, 1138 and 1140 detects when the incoming data remains LOW for 150 nS.

Before the EOP can be detected setting the output EOP of flip-flop 1124 to HIGH, it is necessary to first enable the RS latch comprising AND gates 1114 and 1116 and OR gate 1118 having an output EOP_EN. The latch having output EOP_EN prevents an idle line from continuously signalling an EOP. The EOP_EN latch is set when the Q outputs of flip-flop 1112 of Positive EOP Detect and flip-flop 1134 of Negative EOP Detect section are both LOW indicating that neither has been held constant for 150 nS indicating that valid data is coming in. With both Q outputs of flip-flops 1112 and 1134 held LOW, the output EOP_EN of the RS latch is set HIGH. The first EOP detector (positive or negative) to go HIGH clocks a "1" into the D input of flip-flop 1124 as well as forcing the data transmitted to be held at a "1" (through TX_1). The EOP signal then sets the output WAIT_A of an RS latch comprising OR gate 1126 and AND gate 1128 to HIGH which disables further data reception by setting output CLR_PD_A of Packet Detect circuitry to LOW until the line goes idle for at least 150 nS. Once both IN1N and 1N1P indicate an idle line for 150 nS, the WAIT_A output is reset. During this interval when WAIT_A is LOW, the data path is disabled and the Packet Detect state machine is held reset by signal CLR_PD. This prevents ringing on the line from retriggering the Packet Detect circuitry.

Figure 16:
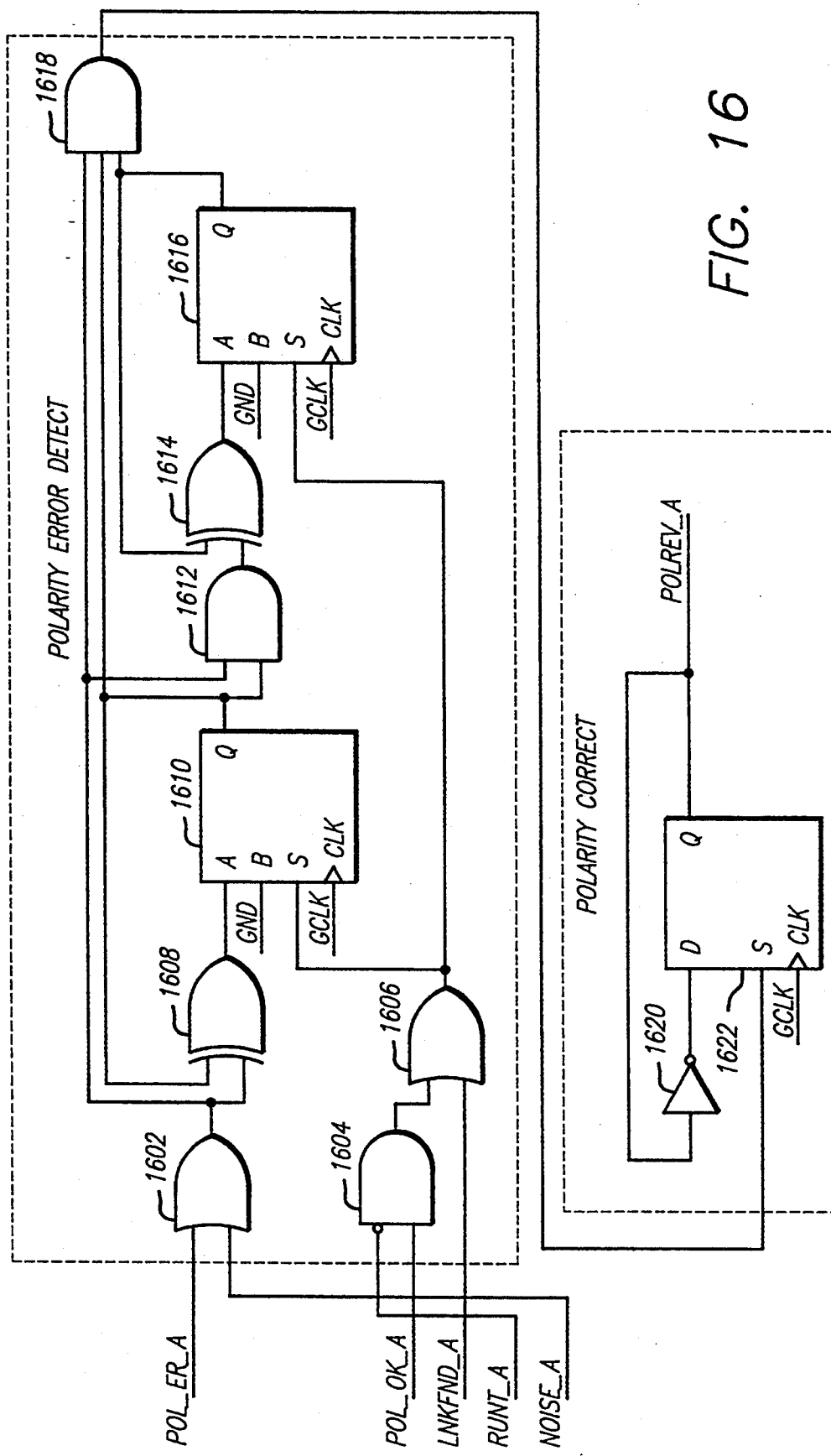
FIG. 16 is a circuit diagram illustrates the Polarity Error Detect and the Polarity Correct state machines of the present invention.

FIG. 16 is a detailed diagram of the Polarity Error Detect and the Polarity Correct state machines. Polarity Error Detect state machine comprises flip-flops 1610 and 1616 and digital logic 1602–1618. Signal POL_ER_A is provided to an input of OR gate 1602. Signal NOISE_A is provided to a second input of OR gate 1602. The output of OR gate 1602 is coupled to an input of Exclusive-OR gate 1608, an input of AND gate 1612 and an input of AND gate 1618. Signal POL_OK_A is provided to an input of AND gate 1604. Signal RUNT_A is provided to a negated input of AND gate 1604. The output of AND gate 1604 is coupled to an input of OR gate 1604. Signal LNK_FND_A is coupled to a second input of OR gate 1606. The output of OR gate 1606 is coupled to S inputs of flip-flops 1610 and 1616. B inputs of flip-flops 1610 and 1616 are coupled to ground. Signal GCLK is provided to the CLK inputs of flip-flops 1610 and 1616. The Q output of flip-flop 1610 is coupled to an input of AND gate 1612, an input of Exclusive-OR gate 1608, and an input of AND gate 1618. The output of AND gate 1612 is coupled to an input of Exclusive-OR gate 1614. The output of Exclusive-OR gate 1614 is coupled to A input of flip-flop 1616. The Q output of flip-flop 1616 is coupled to an input of Exclusive-OR gate 1614 and an input of AND gate 1618.

The Polarity Correct state machine comprises flip-flop 1622 and inverter 1620. The output of AND gate 1618 is coupled to E input of flip-flop 1622. Signal GCLK is coupled to the CLK input flip-flop 1622. The Q output of flip-flop 1622 is signal POLREV_A which is coupled to an input of inverter 1620. The output of inverter 1620 is coupled to D input of flip-flop 1622.

Polarity Error Detect and Polarity Correct state machines count polarity error events (an inverted link pulse or an inverted end of packet). If four such events occur consecutively, the Polarity Correct state machine toggles signal POLREV_A which signals multiplexors 840 and 842 to swap the two input lines (IN1P and IN1N). Any link pulse or packet received with the correct polarity resets the error count to zero thereby preventing false triggering. This occurs if LNKFND_A is set HIGH or if both signal RUNT_A is LOW and signal POL_OK_A is HIGH.

The path for data through the MAU (FIG. 9(a)) passes first through an RS latch comprising OR gate 902 and AND gate 904, then through several controlling gates including AND gate 906 and multiplexers 1012 and 1014 (FIG. 10) to the final output signals TX1P and TX1N. To avoid needing a third data input based on a zero volt comparator threshold, the two biased data inputs IN1P and IN1N are used to set and reset an RS latch comprising OR gate 902 and AND gate 904. The output D_LTCHD of this latch should be a balanced data signal. This data signal is gated by an AND gate that forces the data DIN to a "0" during the extended first bit of a packet (see above description of Packet Detect state machine), during the wait period after the end of packet, and if the link is down as indicated by the Link Status state machine. For the last two conditions, the CLR_PD_A output of OR gate 834 in the Packet Detect section shown in FIG. 8 is held HIGH. In both the wait and link down states, the output enable signal for line drivers are disabled also.

For each twisted pair connection, data can come from one of several sources: the other twisted pair connection, the AUI port, or the internal Link Generator. The data values and output enable signals for all these sources are multiplexed together before being passed to their respective output pins. Thus the circuit of FIGS. 9–12 for a first twisted pair port of the gate array logic has been described in detail. A second such circuit for the opposite side of the gate array logic is not shown because the circuits are duplicates of one another. Therefore, it is not be described for brevity. All signals and circuits of the second side of gate array 770 have the same names as those of FIGS. 8–12 except that the signal references end with _B instead of _A and vice versa. The signals generated by the two circuits for the twisted pair ports of gate array 770 are used in the following discussion of the circuit for the AUI side of gate array 770. The second twisted pair port of gate array 770 includes inputs IN2P and IN2N and outputs TX2P and TX2N.

FIGS. 13–14 illustrate the functional circuitry of the AUI implemented in gate array 770 of the present invention. FIGS. 13(*a*), 13(*b*), and 13(*c*) are detailed diagrams of the Negative Signal Detect Section, AUI EOP Detect Section, and Jabber section of the present invention. The Negative Signal Detect section comprises flip-flops 1308–1314. A signal DON is coupled to an inverter 1370 and an input of AND gate 1372. The output of inverter 1370 is coupled to the CLR inputs of flip-flops 1308, 1310 and 1312. The D input of flip-flop 1308 is coupled to supply voltage $V_{DD}$. The CLK inputs of flip-flops 1308, 1310, 1312 and 1314 are coupled to clock signal GCLK. The Q output of flip-flop 1308 is coupled to the D input of flip-flop 1310. The Q output of flip-flop 1310 is coupled to the D input of flip-flop 1312. The Q output of flip-flop 1312 is coupled to the D input of flip-flop 1314 and to the negated input of OR gate 1332.

The AUI EOP Detect section illustrated in FIGS. 13(*a*), 13(*b*), and 13(*c*) comprises flip-flops 1316, 1322 and 1326 and RS latches. The Q output of flip-flop 1314 is coupled to an input of AND gate 1318. The CLK inputs of flip-flops 1316, 1322 and 1326 are coupled to clock signal GCLK. The Q output of flip-flop 1316 is coupled to an input of AND gate 1318. The output of AND gate 1318 is coupled to an input of OR gate 1320. The output of OR gate 1320 is coupled to an A input of flip-flop 1322 and to an input of OR gate 1324. A B input of flip-flop 1322 is coupled to ground.

A clock signal NS_500 is coupled to buffer 1328. The output of buffer 1328 is coupled to an S input of flip-flop 1322 and to an E input of flip-flop 1326. The Q output of flip-flop 1322 is coupled to a D input of flip-flop 1326, an input of OR gate 1330, and an input of OR gate 1320. Output AUI_EN of AND gate 1334 is coupled to an input of OR gate 1332, an input of AND gate 1344, a negated CLR input of flip-flop 1336 and a D input of flip-flop 1316. The Q output of flip-flop 1326 is coupled to an input of OR gate 1330. The Q output of flip-flop 1326 is a signal AUI_EOP1. The output of OR gate 1332 is coupled to an input of AND gate 1334.

Figure 13B:
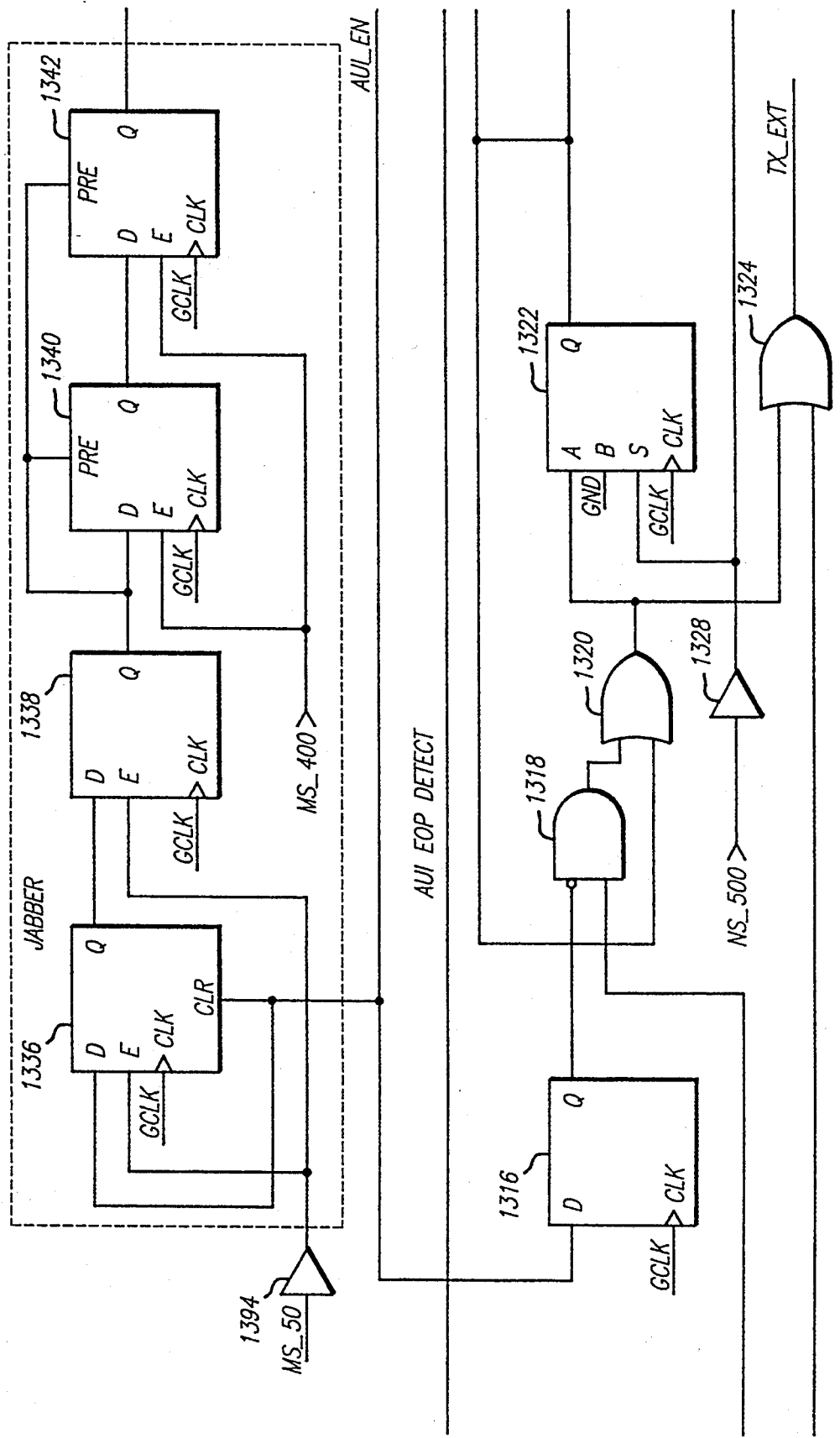
Figure 13C:
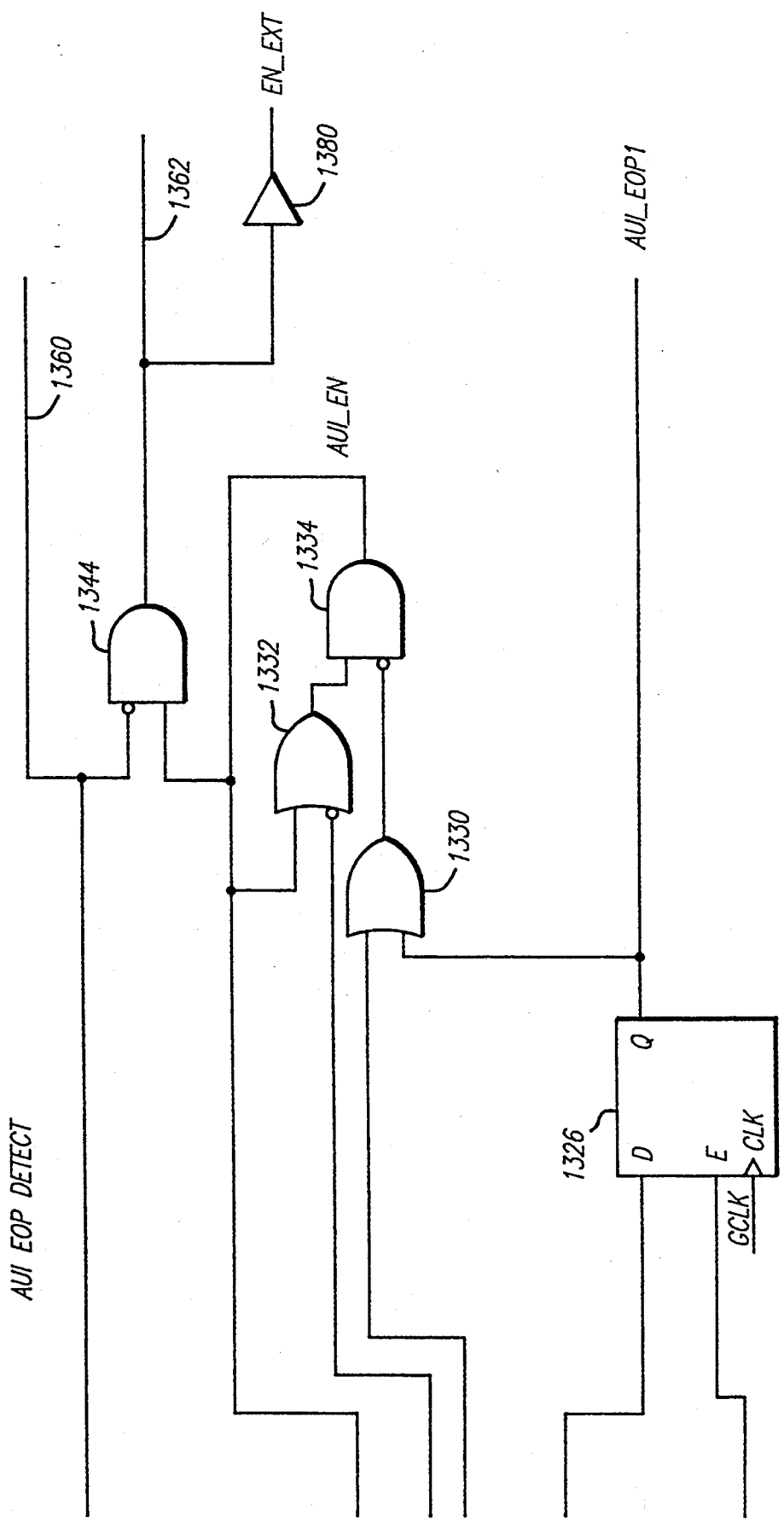

The Jabber section illustrated in FIG. 13(c) comprises flip-flops 1336–1342. A clock signal MS_50 is coupled to a buffer 1394. The output of buffer 1394 is coupled to an E input of flip-flop 1336 and an E input of flip-flop 1338. The CLK inputs of flip-flops 1336, 1338, 1340 and 1342 are coupled to clock signal GCLK. The Q output of flip-flop 1336 is coupled to a D input of flip-flop 1338. The Q output of flip-flop 1338 is coupled to a D input of flip-flop 1340, a PREset input of flip-flop 1340 and a PREset input of flip-flop 1342. The Q output of flip-flop 1340 is coupled to the D input of flip-flop 1342.

Figure 14A:
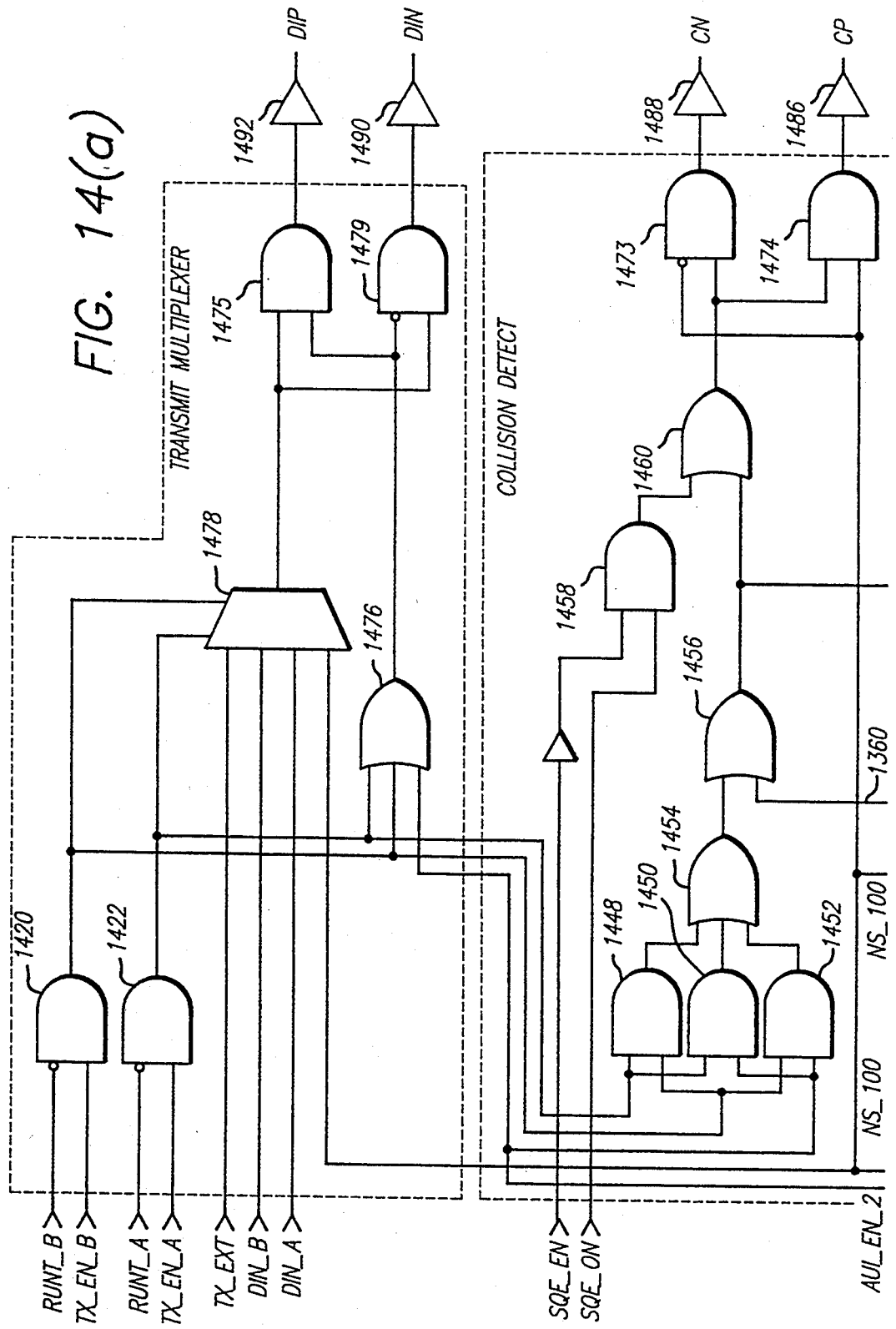
FIGS. 14(a) and 14(b) are detailed schematics of a Transmit Multiplexer, a Collision Detect section (for all ports) and an LED Timing section implemented using a Gate Array in the preferred embodiment of the present invention for an AUI port.

The output 1360 of flip-flop 1342 is coupled to a negated input of AND gate 1344 and an input of OR gate 1456 illustrated in FIG. 14(a). The output 1362 of AND gate 1344 is coupled to an input of buffer 1380. The output of buffer 1362 is signal EN_EXT. A signal DOP is coupled to an input of OR gate 1374. The output of AND gate 1372 is coupled to an input of OR gate 1374. The output of OR gate 1374 is coupled to an input of OR gate 1324. The output of OR gate 1324 is a signal TX_EXT.

FIG. 14 is a detailed diagram illustrating a Transmit Multiplexer section, Collision Detect section and LED Timing section of the AUI circuitry for the present invention. The LED Timing section comprises flip-flops 1466–1472. The output 1362 of AND gate 1344 illustrated in FIG. 13(c) is coupled to a PREset input of flip-flop 1466, an input of OR gate 1476, an input of AND gate 1452 and an input of AND gate 1450. A clock signal MS_20 is coupled to an input of buffer 1464. The output of buffer 1464 is coupled to the E inputs of flip-flops 1466, 1468, 1470 and 1472. The CLK inputs of flip-flops 1466, 1468, 1470 and 1472 are coupled to clock signal GCLK. The D inputs of flip-flops 1466 and 1468 are coupled to ground. The Q output of flip-flop 1466 is coupled to the D input of flip-flop 1470. The Q output of flip-flop 1468 is coupled to the D input of flip-flop 1472. The Q output of flip-flop 1470 is coupled to an input of buffer 1482. The output of buffer 1482 is signal TX_LED. The Q output of flip-flop 1472 is coupled to an input of buffer 1484. The output of buffer 1484 is signal COL_LED. Signals TX_EXT, DIN_B and DIN_A are coupled to data inputs of multiplexor 1478, respectively.

A Transmit Multiplexer circuit comprises multiplexer 1478, AND gates 1420, 1422, 1475 and 1479, and OR gate 1476. Signals RUNT_B and TX_EN_B are coupled to a negated input and a second input of AND gate 1420. The output of AND gate 1420 is coupled to a select input of multiplexor 1478, an input of OR gate 1476, an input of AND gate 1448 and an input of AND gate 1452. Signals RUNT_A and TX_EN_A are coupled to a negated input and a second input of AND gate 1422. The output of AND gate 1422 is coupled to a second select input of multiplexor 1478, an input of OR gate 1476, an input of AND gate 1448 and an input of AND gate 1452. The output of multiplexor 1478 is coupled to an input of AND gate 1475 and a negated input of AND gate 1479. The output of AND gate 1475 is coupled to buffer 1492. The output of buffer 1492 is a signal DIP. The output of OR gate 1476 is coupled to an input of AND gate 1479 and a negated input of AND gate 1475. The output of AND gate 1479 is coupled to buffer 1490. The output of buffer 1490 is a signal DIN.

Figure 14B:
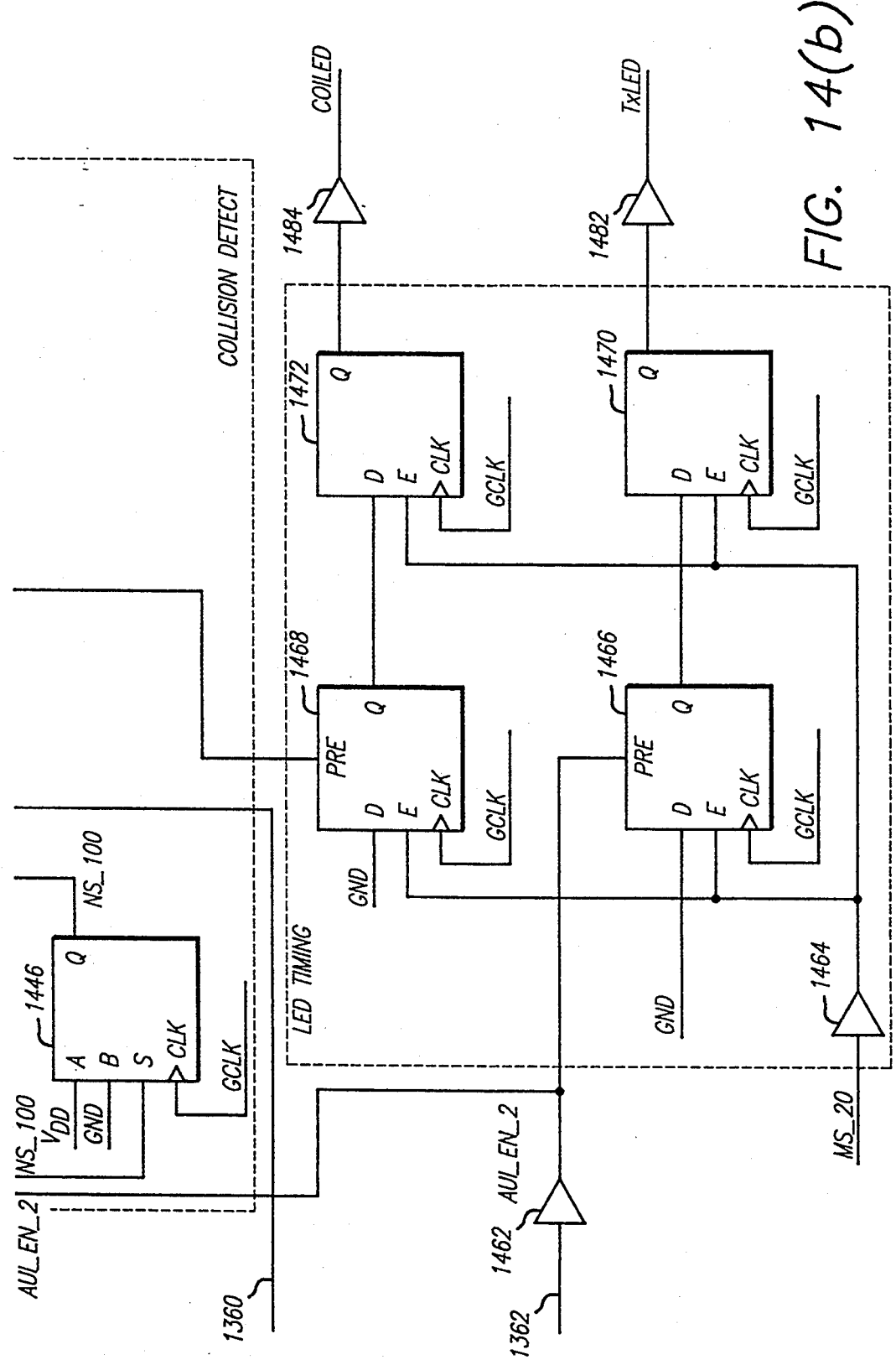

A Collision Detect section for the AUI circuitry of the present invention illustrated in FIGS. 14(a) and 14(b) comprises flip-flop 1446, AND gates 1450, 1452, 1454, 1458, 1473 and 1474, and OR gates 1454 and 1460. An A input of flip-flop 1446 is coupled to supply voltage $V_{DD}$ and a B input of flip-flop 1446 is coupled to ground. The CLK input of flip-flop 1446 is coupled to clock signal GCLK. The Q output of flip-flop 1446 is coupled to an input of AND gate 1474, a negated input of AND gate 1473, a data input of multiplexor 1478 and an S input of flip-flop 1446. The outputs of AND gates 1448, 1450 and 1452 are coupled to inputs of OR gate 1454, respectively. The output of OR gate 1454 is coupled to an input of OR gate 1456. The output of OR gate 1456 is coupled to an input of OR gate 1460 and a PREset input of flip-flop 1468. Signals SQE_EN and SQE_ON are coupled to inputs of AND gate 1458, respectively. The output of AND gate 1458 is coupled to an input of OR gate 1460. The output of OR gate 1460 is coupled to an input of AND gate 1474 and 1473. The output of AND gate 1473 is coupled to buffer 1488. The output of buffer 1488 is a signal CN. The output of AND gate 1474 is coupled to buffer 1486. The output of buffer 1486 is a signal CP.

Referring to FIG. 13(b) and 13(c) if AUI_EN is HIGH, the following are enabled: both twisted pair line drivers by setting the output EN_EXT of buffer 1380 to HIGH, the AUI line driver for loopback by setting the output AUI_EN2 of buffer 1462 shown in FIG. 14(b) to HIGH, the data path from AUI data in to data out, and the timer comprising flip-flops 1466 and 1470 for the Transmit LED shown in FIG. 14(b).

Detection of the end of packet from the AUI connection is similar to that of the EOP detect for the twisted pair section. Referring to FIG. 13(a), when idle, DON is HIGH and the output of invert 1370 stays LOW and flip-flops 1308, 1310, 1312 and 1314 all constantly clock through a "1". When data comes in on the AUI pair, the output of inverter 1370 becomes HIGH at least every 100 nS thereby clearing flip-flops 1308, 1310 and 1312. After a clock, the Q output of flip-flop 1314 also goes LOW and remains LOW. The output of flip-flop 1314 going LOW thereby removing the reset signal from the RS latch comprising AND gate 1318 and OR gate 1320.

Flip-flop 1314 remains LOW until the signal from the AUI stays above −400 mV (the output of buffer 1370 is HIGH) for at least 150 nS. When the output of flip-flop 1314 becomes HIGH, it sets the RS latch comprising AND gate 1318 and OR gate 1320 which forces the data out to be a "1" thereby extending the EOP sequence on the data. After the next clock, the Q output of flip-flop 1322 is HIGH which holds the data out HIGH and resets the RS latch comprising AND gate 1334 and OR gates 1330 and 1332. This disables the output enables of twisted pair and AUI line drivers. The AUI port is now in a wait state and remains in this condition for 500 to 1000 nS.

NS_500 is a 500 nS clock having a 50 nS pulse per interval for timing the wait period after a packet on the AUI. The first NS_500 pulse after the end of packet (any time from 0–500 nS) clears the Q output of flip-flop 1322 to LOW and set the Q output of flip-flop 1326 to HIGH. The second NS_500 pulse (500 nS later) clears the output AUI_EOP1 of flip-flop 1326 and removes the reset signal from the RS latch comprising AND gate 1334 and OR gates 1330 and 1332, thereby exiting the wait state.

When logic detects a packet on the AUI lines DOP and DON, the signal AUI_EN2 output by buffer 1462 shown in FIG. 14(*b*) sets flip-flop 1466. Anytime from 0–20 mS later a pulse on MS_20 passes through buffer 1464 to the E inputs of flip-flops 1466 and 1470 and clocks the HIGH state on the Q output of flip-flop 1466 into flip-flop 1470. The HIGH state on the Q output of flip-flop 1470 passes through buffer 1482 to light the transmit LED. This transmit LED remains lighted for the duration of the packet. When the packet ends, the signal AUI_EN2 output by buffer 1462 goes LOW removing the PREset signal from flip-flop 1466 by clocking in a LOW from the D input of flip-flop 1466. Twenty milliseconds later, another pulse clocks this LOW signal into flip-flop 1470 thereby extinguishing the transmit LED. Thus the transmit LED is lighted from anywhere from between 20 mS and the duration of the packet plus 20 mS.

A collision is detected anytime two or more ports of the gate array logic are active at the same time. The majority gate shown in FIG. 14(*a*) comprising OR gate 1454 and AND gates 1448, 1450 and 1452 checks the enables TX_EN_A, TX_EN_B and AUI_EN2 for the three ports and, if more than one is active, the output of OR gate 1454 goes HIGH, passes through OR gates 1456 and 1460, enabling AND gates 1473 and 1474. This condition gates a 10 MHz square wave onto the collision pair at output CN of buffer 1488 and output CP of buffer 1486 and sets flip-flop 1468. Twenty milliseconds later, flip-flop 1468 sets flip-flop 1472 controlling the collision LED to HIGH and thereby lighting the LED using output Col_LED of buffer 1484. The collision LED turns off 20 mS after the end of a collision.

Thus, an apparatus and a method for extending an Ethernet 10Base-T local area network from allowing only point-to-point links to allowing a daisy-chain of nodes on a segment at a 10Base-T node has been described.

We claim:

1. A connector for connecting a data terminal equipment to signal lines in a local area network comprising:
   first bypass means coupled to said signal lines at a first port, said first bypass means for sending and receiving signals on said signal lines at said first port;
   second bypass means coupled to said first bypass means and to said signal lines at a second port, said second bypass means for sending and receiving signals to and from said first bypass means and on said signal lines at said second port;
   repeater means coupled to said first bypass means, said second bypass means, and said data terminal equipment at a third port, said repeater means for retransmitting signals received from said first bypass means to said data terminal equipment at said third port and to said second bypass means and for retransmitting signals received from said second bypass means to said data terminal equipment and to said first bypass means, and for retransmitting signals from said data terminal equipment at said third port to both of said first and second bypass means; and
   said first and second bypass means coupling said signal lines of said first port to said signal lines of said second port to allow bidirectional communication between said first port and said second port for isolating said repeater means when a supply voltage of said third port provided by said data terminal equipment to said first and second bypass means is interrupted.

2. The connector of claim 1 wherein said first bypass means and said second bypass means each comprise a plurality of relays coupled to said signal lines of said first and second port, respectively.

3. The connector of claim 1 wherein said repeater means is comprised of first and second receive circuits, first and second transmit circuits, and a logic means, said first receive and transmit circuits coupled between said logic means and said first bypass means, and said second receive and transmit circuits coupled between said logic means and said second bypass means, said logic means retransmitting a first data packet pulse from said first port having opposite polarity to a first link pulse from said first port, said first and second receive circuits for processing signals from said first and second ports, said first and second transmit circuits for transmitting signals from said logic means.

4. The connector of claim 3 wherein said repeater means further includes an isolation transformer coupled between said logic means and said data terminal equipment at said third port for isolating said logic means from said data terminal equipment.

5. A connector for connecting a data terminal equipment to signal lines in a network comprising:
   a first bypass circuit coupled to a first port comprising first signal lines, said first port for communicating a first signal on said first signal lines;
   a second bypass circuit coupled to said first bypass circuit and a second port comprising second signal lines, said second port for communicating a second signal on said second signal lines, said first and second bypass circuits for coupling said first port to said second port when a supply voltage is not provided to said connector from said data terminal equipment;
   a first transmitter coupled to said first bypass circuit and to a logic block, said first transmitter for transmitting signals from said logic block;
   a first receiver coupled to said first bypass circuit and to said logic block, said first receiver for processing signals from said first port;
   a second transmitter coupled to said second bypass circuit and to said logic block, said second transmitter for transmitting signals from said logic means;
   a second receiver coupled to said second bypass circuit and to said logic block, said second receiver for processing signals from said second port;
   a third transmitter coupled to said logic block and to said data terminal equipment at a third port, said third transmitter for transmitting signals from said logic means;
   a third receiver coupled to said logic block and to said data terminal equipment at said third port, said third receiver for processing signals from said third port;
   a collision detect circuit coupled to said logic block and to said data terminal equipment at said third port, said collision detect circuit for providing a collision indication to said data terminal;

said logic block for transmitting a signal received at said first port to said second port and said third port, for transmitting a signal received at said second port to said first port and said third port, and for transmitting a signal received at said third port to said first and second port.

6. The connector of claim 5 wherein said data terminal equipment provides said supply voltage for powering said connector.

7. The connector of claim 5 wherein said logic block implements 10Base-T MAU functions specified by IEEE Standard 802.3 for for twisted pair Ethernet.

8. The connector of claim 7 wherein said signal comprises a data packet, said logic block detects said data packet for retransmitting said data packet.

9. The connector of claim 8 wherein said logic block reformats said data packet when a first bit of said data packet has a first polarity of a first bit of link pulses, said logic block changing said first bit of said data packet to a second polarity.

10. The connector of claim 5 wherein a plurality of devices can be daisy chained using a plurality of connectors and appear as a single node on a star topology network implemented with 10base-T twisted pair circuitry.

11. A method for making an Ethernet link segment have the characteristics of an Ethernet bus segment comprising the steps of:
separating said link segment into first and second subsegments whenever power from a power supply is available;
repeating data received on said first subsegment to said second subsegment and to a tap for adding an additional Ethernet node;
repeating data received on said second subsegment to said first subsegment and to said tap;
repeating data received on said tap to said first subsegment and to said second subsegment; and,
bypassing said tap whenever said power is unavailable by connecting said first subsegment to said second subsegment.

12. The method of claim 11 wherein said link segment is a 10Base-T link segment.

13. The method of claim 12 wherein said tap is an attachment unit interface connection.

14. The method of claim 11 wherein said power for repeating said data is provided by said tap.

15. The connector of claim 1 wherein said first and second signal lines comprise first and second 10Base-T twisted pair Ethernet segments.

16. The connector of claim 1 wherein said first and second ports comprise first and second modular connectors.

17. The connector of claim 7 wherein said signal received from said first port comprises link pulses, said logic block detects said link pulses for retransmitting said link pulses to said second port.

18. A connector for connecting a data terminal equipment to signal lines in a local area network comprising:
first bypass means coupled to said signal lines at a first port, said first bypass means for sending and receiving signals on said signal lines at said first port;
second bypass means coupled to said first bypass means and to said signal lines at a second port, said second bypass means for sending and receiving signals to and from said first bypass means and on said signal lines at said second port;
repeater means coupled to said first bypass means, said second bypass means, and said data terminal equipment at a third port, said repeater means for retransmitting signals received from said first bypass means to said data terminal equipment at said third port and to said second bypass means and for retransmitting signals received from said second bypass means to said data terminal equipment and to said first bypass means, and for retransmitting signals from said data terminal equipment at said third port to both of said first and second bypass means; and
said first and second bypass means coupling said signal lines of said first port to said signal lines of said second port for isolating said repeater means when a supply voltage of said third port provided by said data terminal equipment to said first and second bypass means is interrupted, wherein said repeater means is comprised of first and second receive circuits, first and second transmit circuits, and a logic block, said first receive and transmit circuits coupled between said logic means and said first bypass means, and said second receive and transmit circuits coupled between said logic means and said second bypass means, said logic block retransmitting a first data packet pulse having opposite polarity to a first link pulse.

19. The connector of claim 18 wherein said repeater means further includes an isolation transformer coupled between said logic block and said data terminal equipment at said third port.

20. A connector for connecting a data terminal equipment to signal lines in a network comprising:
a first bypass circuit coupled to a first port comprising first signal lines;
a second bypass circuit coupled to said first bypass circuit and a second port comprising second signal lines, said first port coupled to said second port by said first and second bypass circuits when a supply voltage is not provided to said connector;
a first transmitter coupled to said first bypass circuit and to a logic block;
a first receiver coupled to said first bypass circuit and to said logic block;
a second transmitter coupled to said second bypass circuit and to said logic block;
a second receiver coupled to said second bypass circuit and to said logic block;
a third transmitter coupled to said logic block and to said data terminal equipment at a third port;
a third receiver coupled to said logic block and to said data terminal equipment at said third port;
a collision detect circuit coupled to said logic block and to said data terminal equipment at said third port; said logic block for transmitting a signal received at said first port to said second port and said third port, for transmitting a signal received at said second port to said first port and said third port, and for transmitting a signal received at said third port to said first and second port, wherein said logic block implements 10Base-T MAU functions specified by IEEE Standard 802.3 for twisted pair Ethernet, wherein said signal comprises a data packet, said logic block detects said data packet for retransmitting said data packet, wherein said logic block reformats said data packet when a first bit of said data packet has a first polarity of a first bit of link pulses, said logic block changing said first bit of said data packet to a second polarity.

* * * * *